(12) United States Patent
Nogami et al.

(10) Patent No.: US 7,836,784 B2
(45) Date of Patent: Nov. 23, 2010

(54) MOTOR-OPERATED VALVE DIAGNOSING DEVICE

(75) Inventors: Takeki Nogami, Takamatsu (JP); Shigeya Yamaguchi, Takamatsu (JP)

(73) Assignee: Shikoku Research Institute Incorporated, Takamatsu-shi (JP)

( * ) Notice: Subject to any disclaimer, the term of this patent is extended or adjusted under 35 U.S.C. 154(b) by 350 days.

(21) Appl. No.: 11/887,184

(22) PCT Filed: Aug. 3, 2006

(86) PCT No.: PCT/JP2006/305075
§ 371 (c)(1),
(2), (4) Date: Sep. 26, 2007

(87) PCT Pub. No.: WO2006/103925
PCT Pub. Date: Oct. 5, 2006

(65) Prior Publication Data
US 2009/0056479 A1 Mar. 5, 2009

(30) Foreign Application Priority Data
Mar. 29, 2005 (JP) .............................. 2005-093372

(51) Int. Cl.
*G01N 19/00* (2006.01)
(52) U.S. Cl. .................................................. 73/865.9
(58) Field of Classification Search .................. 73/168, 73/865.9, 760, 761
See application file for complete search history.

(56) References Cited

U.S. PATENT DOCUMENTS

| | | | | |
|---|---|---|---|---|
| 2,028,696 A | * | 1/1936 | Beckwith | 251/129.03 |
| 4,570,903 A | * | 2/1986 | Crass | 251/129.12 |
| 4,805,451 A | | 2/1989 | Leon | 73/168 |
| 4,879,901 A | | 11/1989 | Leon | 73/168 |
| 5,257,535 A | * | 11/1993 | Evans | 73/168 |
| 5,594,175 A | * | 1/1997 | Lyon et al. | 73/593 |

(Continued)

FOREIGN PATENT DOCUMENTS

JP 5-12591 A 1/1993

(Continued)

*Primary Examiner*—Hezron Williams
*Assistant Examiner*—Tamiko D Bellamy
(74) *Attorney, Agent, or Firm*—Birch, Stewart, Kolasch & Birch, LLP

(57) ABSTRACT

To provide a motor-operated valve diagnosing device capable of making a highly accurate diagnosis at a low cost. In a motor-operated valve diagnosing device for diagnosing a motor-operated valve having a motor-operated valve having a valve element driving part for opening and closing a valve element, and a spring cartridge which expands and contracts in proportion to a reaction force exerted thereon from the valve element driving part, a spring compression mechanism or a worm displacement measuring means is configured to be attached to the valve element driving part via an adapter. With this configuration, the spring compression mechanism and so on can be easily attached to and removed from the valve element driving part. In addition, since the spring compression mechanism and so on can be attached to the valve element driving part without any alternation of the valve element driving part, the spring compression mechanism can be shared by two or more motor-operated valves, and reduction of expense for a diagnosis of a motor-operated valve and improvement in accuracy of diagnosis can be achieved.

16 Claims, 15 Drawing Sheets

U.S. PATENT DOCUMENTS

| | | | |
|---|---|---|---|
| 7,516,656 B2 * | 4/2009 | Nogami et al. | 73/168 |
| 7,596,457 B2 * | 9/2009 | Nogami et al. | 702/34 |
| 2007/0246669 A1 * | 10/2007 | Nogami et al. | 251/129.01 |
| 2008/0006101 A1 * | 1/2008 | Nogami et al. | 73/865.9 |

FOREIGN PATENT DOCUMENTS

| | | |
|---|---|---|
| JP | 7-310845 A | 11/1995 |
| JP | 2942562 B2 | 6/1999 |
| JP | 2982090 B2 | 9/1999 |
| JP | 2003-161661 A | 6/2003 |
| JP | 3486595 B2 | 10/2003 |

* cited by examiner

MOTOR-OPERATED VALVE DIAGNOSING DEVICE

CROSS REFERENCE TO RELATED APPLICATIONS

This application is National Stage entry of International Application number PCT/JP2006/305075 filed on Aug. 3, 2006, and claims priority under 35 U.S.C. §119 to Japanese application 2005-093372, filed on Mar. 29, 2005, the contents hereby incorporated by reference.

TECHNICAL FIELD

The present invention relates to a motor-operated valve diagnosing device provided with an adapter for diagnosis usable by an apparatus for diagnosing a motor-operated valve such as a spring compression mechanism or a worm displacement measuring means for making a diagnosis on torque.

BACKGROUND ART

Conventionally, valve devices of different shapes, sizes and structures are proposed and used depending on the application, use conditions, operating conditions and so on. Among the wide variety of valve devices, large-sized valve devices are principally used in large facilities such as industrial plants or power plants having a large-scale piping system. As such large-sized valve devices, motor-operated valves which operate on electric power are usually employed in view of operability and operation reliability.

Such a motor-operated valve has a valve element for opening and closing a passage in a pipe, a worm rotatably driven by a motor or human power, a valve element driving part which receives torque from the worm to open and close the valve element, a spring cartridge in which disc springs are held in a compressed state by a prescribed compression force (the compression force is referred to as "preload") and which can expand or contrast in proportion to a thrust generated in the worm. When the valve element is opened or closed, the torque is applied to the valve element driving part. Then, when the amount of compression of the spring cartridge reaches a predetermined value (which corresponds to "set torque"), the motor is stopped by a torque switch to ensure an appropriate open/close retention force on the valve element for reliable valve function and to prevent damage to any part caused by an excessively large driving force and overload on the motor.

In order to allow a motor-operated valve to maintain its original functions over a long period of time, a diagnosis should be made on various points. Above all, the diagnosis on the set torque, that is, the diagnosis on whether or not an appropriate open/close retention force is exerted on the valve element when it is in full open or close position, in other words, whether the compression force on the spring cartridge (which is proportional to torque) or the amount of compression of the spring cartridge (which depends on the compression force, that is, the torque) is maintained in an appropriate state is one of the most important point to be checked.

However, the spring characteristic of the spring cartridge (the correspondence relation between the compression force and the amount of compression) varies with time because, for example, of wear or a change in the alignment of the disc springs, or loosening of the nut at an end of the spring cartridge. Therefore, it is necessary to diagnose the set torque at times and determine its appropriateness. As methods for diagnosing the set torque, various methods have been proposed. One representative example is an "external torque sensor method" described in Patent Document 1 shown below (paragraphs [0021] to [0031], FIG. 1 to FIG. 4), and another representative example is a "spring compression method" described in Patent Document 2 shown below (paragraphs [0028] to [0036], FIG. 1 and FIG. 2). In both the methods, a measuring means for acquiring information on torque, that is, the compression force on the spring cartridge and the amount of compression of the spring cartridge, is attached to an outer end of the spring cartridge and a diagnosis on torque of the motor-operated valve including the set torque is conducted based on information acquired by the measuring means.

Patent Document 1 and Patent Document 2 herein are JP-B-2982090 and JP-A-H07-310845, respectively.

DISCLOSURE OF THE INVENTION

Problem to be Solved by the Invention

The "external torque sensor method" shown in Patent Document 1 is applied to a motor-operated valve. A compression force detecting means for detecting the compression force on the spring cartridge and a displacement detecting means for detecting the amount of compression of the spring cartridge, that is, the displacement of the worm, are attached to an outer end of the spring cartridge. Then, a spring characteristic of the spring cartridge is obtained based on the relation between the amount of compression of the spring cartridge and the compression force on the spring cartridge detected by the displacement detecting means and the compression force detecting means, respectively, while the motor-operated valve is operating, and the appropriateness of the set torque is determined based on the spring characteristic.

However, such an "external torque sensor method" has the following problems. Since the devices to be attached to the motor-operated valve are large and complicated, the operating efficiency is poor. Since the measurement is made while the motor-operated valve is operating, the time of diagnosis should be carefully chosen. In addition, in some plants, the set torque at a time when the torque switch is activated cannot be measured since the torque switch is not permitted to be activated for diagnosis purpose from the viewpoint of preventing a load greater than necessary from being applied to the valve shaft.

The "spring compression method" shown in Patent Document 2 is applied to a motor-operated valve. A load meter, a position detecting means and a compressing means are attached to an outer end of a torque balance spring (which corresponds to the spring cartridge) (that is, the end of the torque balance spring opposite the worm). Then, the disc springs of the torque balance spring are compressed with the compressing means when the motor-operated valve is in a stopped state, and the compression force on the torque balance spring and the amount of compression of the torque balance spring in this state are measured by the load meter and the position detecting means, respectively.

However, the "spring compression method" requires a substantial diagnosis cost because, when a load meter, a position detecting means, a compressing means and so on are installed in the motor-operated valve, the motor-operated valve must be properly altered to allow the installation of the load meter and so on, because the load meter and so on are difficult to be shared among motor-operated valves and must be produced for each motor-operated valve, because it takes considerable time and effort to install the load meter and so on since they must be corrected for each motor-operated valve, and so on.

In addition, since the load meter is located between a spring bearing of the torque balance spring located in a housing and a support provided on the housing for positional adjustment in the axial direction of the worm and supported by the support, the positions of the support and so on must be finely adjusted before the measurement of load with the use of the load meter. Thus, the measurement process is complicated and low in operating efficiency. Moreover, since the load meter is disposed in a limited space for positional adjustment, the shape and function of the load meter are strictly limited. It is therefore difficult to select a measurement method freely among various methods when the compression force on the torque balance spring is measured.

Further, both the methods cannot measure a characteristic of the spring cartridge when it is a separated state. In particular, a characteristic of the spring cartridge of a large-sized motor-operated valve cannot often be measured unless it is separated because of its weight and limitation in work space. In such a case, the methods are of no use.

It is, therefore, a primary object of the present invention to provide a motor-operated valve diagnosing device which has a spring compression mechanism or a worm displacement measuring means attachable to a motor-operated valve when a diagnosis of a motor-operated valve is conducted, and which has an adapter that enables the spring compression mechanism and so on to be easily attached to and removed from the motor-operated valve and allows shared use of the spring compression mechanism and so on by a plurality of motor-operated valves, thereby allowing an accurate diagnosis to be made at low cost.

Means for Solving the Problem

As specific means for solving the above problems, the present invention adopts the following constitutions.

A first aspect of the present invention provides a motor-operated valve diagnosing device for diagnosing a motor-operated valve which comprises a valve element driving part for opening and closing a valve element using a rotational driving force of a worm to which a rotational driving force is applied, and a spring cartridge which expands and contracts in proportion to a reaction force exerted thereon from the valve element side of the valve element driving part in an axial direction of the worm, the motor-operated valve diagnosing device comprising a spring compression mechanism operable for compressing the spring cartridge externally and measuring a compression force thereon in simultaneous with an amount of compression thereof, or a worm displacement measuring means, wherein the spring compression mechanism or the worm displacement measuring means is attachable to the valve element driving part via an adapter.

The adapter has a function of adjusting the dimensions of the valve element driving part and the spring compression mechanism or the worm displacement measuring means without requiring any change in the structure of the valve element driving part when the spring compression mechanism it attached to the valve element driving part, and is removably attached to the valve element.

A second aspect of the present invention provides a motor-operated valve diagnosing device of the first aspect, wherein the spring compression mechanism is attachable to a support tool for supporting the spring cartridge in a separated state via the adapter.

The adapter has a function of adjusting the dimensions of the support tool and the spring compression mechanism without requiring any change in the structure of the support tool when the spring compression mechanism is attached to the support tool, and is removably attached to the support tool. In this case, the support tool allows the spring cartridge to be attached thereto under the same conditions as those under which it is attached to the valve element driving part. Therefore, the structure of the support tool is the same as the structure of the valve element driving part as long as the structure of the spring cartridge is not changed, and adapters with the same structure can be shared by the support tool and the valve element driving part.

A third aspect of the present invention provides a motor-operated valve diagnosing device of the first or second aspect, wherein the spring compression mechanism has a unitary structure including a base attachable to the adapter; a pusher assembled to the base for reciprocating movement in an axial direction thereof; a compressing means for pressing the pusher in an axial direction thereof to compress the spring cartridge via the pusher; a compression force measuring means for measuring an axial force on the pusher as a compression force on the spring cartridge; and a compression amount measuring means for measuring an axial displacement of the pusher as an amount of compression of the spring cartridge.

The base serves as a tool for attaching the spring compression mechanism to the support tool or the valve element driving part via the adapter and as a base of the entire spring compression mechanism, and supports the pusher for reciprocating movement in its axial direction. When the spring cartridge is compressed by the pusher, the compression force on the spring cartridge and the amount of compression of the spring cartridge are measured by the compression force measuring means and the compression amount measuring means, respectively, and a spring characteristic of the spring cartridge is acquired from the measured values.

A fourth aspect of the present invention provides a motor-operated valve diagnosing device of the third aspect, wherein the compression force measuring means is capable of measuring both a compression force which is exerted on the spring cartridge when the motor-operated valve is operating, and a compression force which is exerted on the spring cartridge by compression of the compressing means when the motor-operated valve is in a stopped state.

The directions of the compression force which is exerted on the spring cartridge (the directions in which the spring cartridge is compressed) during valve closing operation and valve opening operation are different in different motor-operated valves. A compression force is exerted in a first axial direction of the spring cartridge during valve closing operation and in the opposite direction during valve opening operation in some motor-operated valves, and a compression force is exerted in a first axial direction of the spring cartridge during valve opening operation and in the opposite direction during valve closing operation in the other motor-operated valves. Therefore, in one motor-operated valve, the directions of the compression force on the spring cartridge during valve closing operation and during valve opening operation are opposite.

In a motor-operated valve of either type, when the spring cartridge is compressed by a compressing means when the motor-operated valve is in a stopped state as in this invention, the direction in which the compressing means compresses the spring cartridge and the direction in which the spring cartridge is compressed when the motor-operated valve is operating are set to be opposite. That is, in the case where the spring cartridge is compressed in a first direction by the compressing means when the motor-operated valve is in a stopped state and the compression force at a time when the spring cartridge is compressed in the first direction is measured, for example, the compression force at a time when the spring cartridge is compressed in the opposite direction is measured when the motor-operated valve is operating.

A fifth aspect of the present invention provides a motor-operated valve diagnosing device of the fourth aspect, further comprising the worm displacement measuring means, wherein the worm displacement measuring means is operable for measuring an axial displacement of the worm when the motor-operated valve is operating.

The worm displacement measuring means measures the axial displacement of the worm when the motor-operated valve is operating. Therefore, based on the worm displacement measured by the worm displacement measuring means, that is, the amount of compression of the spring cartridge and the compression force on the spring cartridge measured by the compression force measuring means of the spring compression mechanism, a spring characteristic of the spring cartridge at a time when the motor-operated valve is operating can be acquired.

A sixth aspect of the present invention provides a motor-operated valve diagnosing device of the third, fourth or fifth aspect, wherein the compressing means comprises a hydraulic pressure driving mechanism.

As the hydraulic pressure driving mechanism, a cylinder mechanism using a linearly displaceable hydraulic cylinder and a motor mechanism using a rotationally displaceable hydraulic pressure motor are thought of. In view of purpose of the hydraulic pressure driving mechanism of axially exerting a compression force on the spring cartridge, a cylinder mechanism is preferably employed. However, when the rotational displacement is converted to linear displacement by a rack and pinion mechanism or a clank mechanism, the same effect as that of a cylinder mechanism can be obtained with a motor mechanism.

A seventh aspect of the present invention provides a motor-operated valve diagnosing device of the sixth aspect, wherein the hydraulic pressure driving mechanism is manually operable.

As a hydraulic pump for supplying hydraulic oil to the hydraulic pressure driving mechanism, a manual (hand-operated or foot-operated) hydraulic pump is employed.

A eighth aspect of the present invention provides a motor-operated valve diagnosing device of the sixth aspect wherein the hydraulic pressure driving mechanism is electrically operable.

As a hydraulic pump for supplying hydraulic oil to the hydraulic pressure driving mechanism, en electric hydraulic pump is employed.

A ninth aspect of the present invention provides a motor-operated valve diagnosing device of the eighth aspect, wherein the hydraulic pressure driving mechanism compresses the spring cartridge with a compression characteristic corresponding to operating characteristics of the worm at a time when the motor-operated valve is operating.

Since the hydraulic pressure driving mechanism is electrically operated, its operating characteristics can be electrically controlled. Therefore, the hydraulic pressure driving mechanism can be controlled based on a compression characteristic (changes in compression force or amount of compression with time) of the spring cartridge stored in advance to compress the spring cartridge.

INDUSTRIAL APPLICABILITY

According to the motor-operated valve diagnosing device of the present invention, the following specific effects can be achieved.

(a) According to the motor-operated valve diagnosing device of the first aspect of the present invention, the spring compression mechanism or the worm displacement measuring means is attachable to the valve element driving part via an adapter. Thus, there is no need for any alternation to be made in the valve element driving part when the spring compression mechanism or the worm displacement measuring means is attached to the valve element driving part, and, therefore, the spring compression mechanism or the worm displacement measuring means can be shared by motor-operated valves having at least a spring cartridge of the same structure. As a result, reduction of expense for a diagnosis of a motor-operated valve, that is, diagnosis cost, can be achieved in contrast to the conventional case where an exclusive spring compression mechanism or worm displacement measuring means must be provided for each motor-operated valve.

Also, since the spring compression mechanism or the worm displacement measuring means is attachable to the valve element driving part via an adapter, a diagnosis on torque such as the set torque can be made when the compression force which is exerted on the spring cartridge when the motor-operated valve is operating (proportional to torque) is acquired based on the worm displacement, that is, the amount of compression of the spring cartridge, measured by the worm displacement measuring means when the motor-operated valve is operating and spring characteristic data of the spring cartridge measured by the spring compression mechanism. In particular, since the adapters of the worm displacement measuring means and the spring compression mechanism have the same shape so that they can be used interchangeably, the amount of compression of the spring cartridge can be measured under the same conditions. Therefore, a diagnosis on torque such as the set torque can be made with high accuracy. In addition, when adapters of various other motor-operated valve diagnosing apparatuses, as well as the spring compression mechanism and the worm displacement measuring means, are made interchangeable and the apparatuses are made attachable via the adapters, the variation of the pattern of diagnosis of motor-operated valves can be widened.

(b) According to the motor-operated valve diagnosing device of the second aspect of the present invention, the spring compression mechanism is attachable to a support tool for supporting the spring cartridge in a separated state via the adapter. Thus, when the spring cartridge removed from the motor-operated valve and in a separated state is attached to the support tool and compressed by the spring compression mechanism to measure the compression force on the spring cartridge and the amount of compression of the spring cartridge, a spring characteristic of the spring cartridge can be acquired based on the compression force on the spring cartridge and the amount of compression of the spring cartridge. Therefore, even in a diagnosis in a situation in which measurement cannot be made with the spring cartridge assembled to the motor-operated valve because of space limitations, for example, a spring characteristic can be acquired easily and reliably.

Also, since the spring compression mechanism is attachable to the support tool via the adapter, the spring compression mechanism can be used for two or more spring cartridges without any alternation of the support tool as long as the spring cartridges have the same structure.

In addition, the adapter has a function of adjusting the dimensions of the support tool and the spring compression mechanism without requiring any change in the structure of the support tool when the spring compression mechanism is attached to the support tool, and the support tool is configured to allow the spring cartridge to be assembled thereto under the same conditions as those under which it is assembled to the valve element driving part. Therefore, adapters having the same structure can be shared by the support tool and the valve element driving part, and reduction of diagnosis cost through shared use of the adapters can be expected.

(c) According to the motor-operated valve diagnosing device of the third aspect of the present invention, the following specific effects, in addition to the effects described in (a) or (b), can be achieved. In this aspect, the spring compression mechanism has a unitary structure including a base attachable to the adapter, a pusher assembled to the base for reciprocating movement in an axial direction thereof, a compressing means for pressing the pusher in an axial direction thereof to compress the spring cartridge via the pusher, a compression force measuring means for measuring an axial force on the pusher as a compression force on the spring cartridge, and a compression amount measuring means for measuring an axial displacement of the pusher as an amount of compression of the spring cartridge. Thus, when the spring compression mechanism is attached or removed, the spring compression mechanism can be attached to or removed from the valve element driving part or the support tool as a unit. Therefore, processes before and after a diagnosis of the motor-operated valve can be facilitated in contrast to the case where a plurality of components must be attached or removed.

In addition, since the compressing means presses the pusher in an axial direction thereof and compresses the spring cartridge via the pusher, and the axial force on the pusher is measured by the compression force measuring means as the compression force on the spring cartridge, a load cell or a hydraulic pressure gauge can be used as needed to measure the compression force, and the compression force can be measured by simply causing the compressing means to press the pusher in an axial direction thereof. Therefore, the measurement can be made easily and quickly and, therefore, the work efficiency in a diagnosis of a motor-operated valve can be improved in contrast to a conventional spring compression mechanism (for example, the one disclosed in Patent Document 2) which requires fine adjustment of the position of a support for supporting a load meter or the like before measurement of load with the load meter.

In addition, at the measurement of the compression force, the load at a time when the compression of the spring cartridge is started can be detected precisely as the actual preload by simply causing the compressing means to press the pusher in an axial direction thereof, the operability and the measurement accuracy can be significantly improved in contrast to the case where the displacement gauge must be reset to zero when the spring cartridge is pressed and slightly compressed and, therefore, an error is involved between the actual preload (that is, the load at a time when the spring cartridge is pressed and starts compressing) and the preload measured by a load meter (that is, the load at a time when the displacement gauge is reset) as shown in FIG. 14 as in the case of the conventional spring compression mechanism shown in Patent Document 2, for example.

(d) According to the motor-operated valve diagnosing device of the fourth aspect of the present invention, the following specific effects, in addition to the effects described in (c), can be achieved. In this aspect, the compression force measuring means of the motor-operated valve diagnosing device of the third aspect is capable of measuring both a compression force which is exerted on the spring cartridge when the motor-operated valve is operating and a compression force which is exerted on the spring cartridge by compression of the compressing means when the motor-operated valve is in a stopped state. Therefore, reduction of cost by reduction of the number of parts and simplification of the structure can be achieved in contrast to the case where a compression force measuring means for measuring the compression force which is exerted on the spring cartridge when the motor-operated valve is operating and a compression force measuring means for measuring the compression force which is exerted on the spring cartridge when the motor-operated valve is in a stopped state are separately provided.

In addition, since the compression force which is exerted on the spring cartridge when the motor-operated valve is operating and the compression force which is exerted on the spring cartridge when the motor-operated valve is in a stopped state can be measured by a single compression force measuring means, no detection error is involved between the compression forces. Therefore, highly accurate measurement is guaranteed and, therefore, a reliable diagnosis can be made in contrast to the case where the compression forces are separately measured by separate compression force measuring means and there is a detection error between the compression force measuring means.

(e) According to the motor-operated valve diagnosing device of the fifth aspect of the present invention, the following specific effect, in addition to the effects described in (d), can be achieved. In this aspect, the worm displacement measuring means for measuring an axial displacement of the worm when the motor-operated valve is operating is provided. Therefore, when the motor-operated valve is in a stopped state, the compression force on the spring cartridge and the amount of compression of the spring cartridge can be measured simultaneously by causing the spring compression mechanism to compress the spring cartridge externally and a spring characteristic of the spring cartridge during compression in one direction (during valve closing operation or valve opening operation) can be acquired. When the motor-operated valve is operating, the amount of compression of the spring cartridge and the compression force on the spring cartridge can be measured by the worm displacement measuring means and the compression force measuring means of the spring compression mechanism, respectively, and a spring characteristic of the spring cartridge during compression in the opposite direction (during valve opening operation or valve closing operation) can be acquired as long as the spring compression mechanism it attached. Since a spring characteristic corresponding to the compression direction of the spring cartridge can be directly measured during both closing operation and opening operation of the motor-operated valve as described above, highly accurate measurement is guaranteed and, therefore, a reliable diagnosis can be made in contrast to the case where the compression force in a second direction is obtained from a spring characteristic in a first direction and the amount of compression in the second direction.

(f) According to the motor-operated valve diagnosing device of the sixth aspect of the present invention, the following specific effect, in addition to the effects described in (c), (d) or (e), can be achieved. In this aspect, the compressing means is constituted of a hydraulic pressure driving mechanism. Therefore, a higher effect can be achieved with a simpler structure in contrast to the case where the compressing means is constituted of a mechanical driving mechanism, for example. As a result, a required compression force can be easily exerted on the spring cartridge and a quick and reliable diagnosis can be guaranteed for that.

(g) According to the motor-operated valve diagnosing device of the seventh aspect of the present invention, the following specific effect, in addition to the effects described in (f), can be achieved. In this aspect, the hydraulic pressure driving mechanism is manually operable. Therefore, since the hydraulic pressure driving mechanism can be inexpensive, the spring compression mechanism, therefore, the motor-operated valve can be provided less expensively in contrast to the case where the hydraulic pressure driving mechanism is electrically operable, for example.

(h) According to the motor-operated valve diagnosing device of the eighth aspect of the present invention, the following specific effect, in addition to the effects described in (f), can be achieved. In this aspect, since the hydraulic pressure driving mechanism is electrically operable, simplification of operation is achieved and there can be provided a motor-operated valve with high operability in contrast to the case where the hydraulic pressure driving mechanism is manually operable, for example.

(i) According to the motor-operated valve diagnosing device of the ninth aspect of the present invention, the following specific effects, in addition to the effects described in (h), can be achieved. In this aspect, the hydraulic pressure driving mechanism is configured to compress the spring cartridge with a compression characteristic corresponding to operating characteristics of the worm at a time when the motor-operated valve is operating. Therefore, by controlling the operating characteristics of the hydraulic pressure driving mechanism such that the compression characteristic of the spring cartridge created by the compressing means corresponds to an actual compression characteristic (compression rate, for example) at a time when the motor-operated valve is operating, for example, a reliable diagnosis based on actual operating conditions of the motor-operated valve can be made. That is, the actual compression characteristic of the spring cartridge at a time when the motor-operated valve is operating reflects the influences of resistive factors which are generated with compression of the spring cartridge such as the viscosity resistance of grease filled in the spring cartridge, which varies according to the rate of compression of the spring cartridge, the sliding resistance between disc springs of the spring cartridge, and the sliding resistance between circumferential parts in contact with the disc springs and the disc springs. Therefore, by controlling the compression characteristic of the spring cartridge created by the compressing means to correspond to an actual compression characteristic at a time when the motor-operated valve is operating, a highly reliable diagnosis based on actual operating conditions of the motor-operated valve can be made.

BEST MODE FOR CARRYING OUT THE INVENTION

Description will be hereinafter made of a motor-operated valve diagnosing device according to the present invention in detail based on preferred embodiments thereof.

FIG. 1 shows a valve element driving part of a motor-operated valve during normal operation. In FIG. 1, designated as 1 is a valve shaft, as 2 is a worm wheel connected to the valve shaft 1 via a stem nut 5, and as 3 is a worm in meshing engagement with the worm wheel 2. A motor shaft 14 is in splined engagement with the worm 3. When the worm 3 is rotated by torque from the motor shaft 14, the valve shaft 1 is axially moved up or down via the worm wheel 2 and the stem nut 5 to shift a valve element (not shown) to its open or close position.

A worm shaft 4 extends integrally from an axial end of the worm 3, and the motor shaft 14 is in splined engagement with both the worm 3 and the worm shaft 4. Therefore, the worm 3 is movable axially along the motor shaft 14 together with the worm shaft 4.

An operation element of a torque switch 13 is positioned in a circumferential groove 4a formed circumferentially in the exterior of the worm shaft 4. The torque switch 13 is activated when the worm 3 is moved from its neutral position (that is, a position where only the preload is applied to the spring cartridge 8 and no external force is applied in a direction to compress the spring cartridge 8) either in one axial direction (for example, a valve closing direction) or in the opposite direction (for example, a valve opening direction) to such an extent that the displacement of the worm 3 in the direction reaches a prescribed value, and outputs a stop signal to stop rotation of the motor shaft 14 in order to prevent the transmission of excessive torque to the valve shaft 1 for protection of the motor-operated valve from damage.

A bearing 19 is attached to an end of the worm shaft 4, and a movable shaft 6, which is described below, is connected to the worm shaft 4 via the bearing 19 for relative rotation. The movable shaft 6 is in the shape of a double-diameter cylinder and has a large-diameter cylindrical portion 6a, in which the bearing 19 is fixedly fitted, and a small-diameter cylindrical portion 6b extending from the large-diameter cylindrical portion 6a. The movable shaft 6 is axially displaceable together with the worm 3 with axial movement thereof. A spring cartridge 8, which is described below, is mounted on the small-diameter cylindrical portion 6b of the movable shaft 6.

The spring cartridge 8, which generates a prescribed torque in the worm wheel 2 via the worm 3, has a plurality of disc springs 9 stacked between a first washer 10 located on the side of the step between the large-diameter cylindrical portion 6a and the small-diameter cylindrical portion 6b of the movable shaft 6 and a second washer 11 located on the side of a nut 7 threaded on an end of the small-diameter cylindrical portion 6b with a preload applied to them such that their front and reverse sides are alternately oriented in opposite directions. Designated as 12 is a stopper for limiting the maximum compression stroke of the disc springs 9.

The movable shaft 6 and the spring cartridge 8 are received in a small-diameter bore 16 and a large-diameter bore 17, respectively, formed in a casing 15 of the valve element driving part. That is, the small-diameter bore 16 and the large-diameter bore 17 are formed coaxially with each other with the large-diameter bore 17 located on the side of an end face 15a of the casing 15, and the movable shaft 6 is received in the small-diameter bore 16 and the spring cartridge 8 in the large-diameter bore 17. The movable shaft 6 is axially displaceable in the small-diameter bore 16, and the spring cartridge 8 is compressible and expandable in the large-diameter bore 17. A shoulder 18 between the small-diameter bore 16 and the large-diameter bore 17 inhibits the washer 10 of the spring cartridge 8 from moving to the side of the worm 3.

At an end of the large-diameter bore 17 opening in the end face 15a of the casing 15, a adapter 20 in the shape of a flanged cylinder and having a flange portion 20a and a cylindrical portion 20b is disposed with the cylindrical portion 20b fitted in the large-diameter bore 17, and secured to the end face 15a by bolts 22 with a packing interposed therebetween.

A cap 21 is attached to the adapter 20. The cap 21 is in the shape of a bottomed, flanged cylinder and has an end face portion 21a and a cylindrical portion 21b. The cap 21 is attached to the adapter 20 by securing the end face portion 21a to an outer face of the flange portion 20a of the adapter 20 by bolts 23 with the cylindrical portion 21b extending from axially outside the adapter 20 into the inner opening thereof. In this case, the length of the cylindrical portion 21b of the cap 21 is so determined that the distal end face of the cylindrical portion 21b abuts against the washer 11 of the spring cartridge 8 when the cap 21 is secured to the adapter 20.

The operation of the motor-operated valve will be described briefly.

There are the following two correlation patterns between the operating direction of the motor-operated valve (that is, opening operation and closing operation) and the direction in which the spring cartridge 8 is compressed (that is, the direction in which the worm 3 is moved);

"First correlation pattern": A pattern in which the worm 3 is moved to the left as viewed in FIG. 1 and the spring cartridge 8 is compressed from its axial outer end side (that is, from the washer 11 side) when the motor-operated valve is opened, and the worm 3 is moved to the right as viewed in FIG. 1 and the spring cartridge 8 is compressed from its axial inner end side (that is, from the washer 10 side) when the motor-operated valve is closed; and "Second correlation pattern": A pattern in which the worm 3 is moved to the right as viewed in FIG. 1 and the spring cartridge 8 is compressed from its axial inner end side (that is, from the washer 10 side) when the motor-operated valve is opened, and the worm 3 is moved to the left as viewed in FIG. 1 and the spring cartridge 8 is compressed from its axial outer end side (that is, from the washer 11 side) when the motor-operated valve is closed.

In this embodiment, the "first correlation pattern" is employed. It is, however, needles to say that the present invention is not limited to the "first correlation pattern," and is also applicable to the "second correlation pattern."

For example, when the motor-operated valve is shifted from an open state to a full close position, a motor is rotated in one direction to cause the motor shaft 14 to rotate the worm 3. When the worm 3 rotates, the worm wheel 2 is rotated in the closing direction, and the valve shaft 1 is moved downward by the stem nut 5, which rotates together with the worm wheel 2, whereby valve element closing operation is started. During the valve element closing operation, only a small load is applied to the valve shaft 1 and a reaction force large enough to compress the spring cartridge 8 is not usually applied to the worm shaft 4. In this case, the worm 3 rotates in its neutral position.

When the valve element is further moved down and abuts against a valve seat (not shown), since the valve element cannot be further moved down, rotational resistance is generated on the worm wheel 2 side and an axial thrust as a reaction force thereof is applied to the worm 3. The thrust exerted on the worm 3 is transmitted to the washer 10 of the spring cartridge 8 via the bearing 19 and the movable shaft 6, and the spring cartridge 8 is urged toward the nut 7. At this time, the washer 11 at the other end of the spring cartridge 8 is in contact with the distal end face of the cylindrical portion 21b of the cap 21 and restricted from moving, a compression force is applied to the disc springs 9 in the spring cartridge 8.

Since the spring cartridge 8 has been compressed by applying a prescribed preload, the spring cartridge 8 is not compressed but maintains its initial compressed state (the configuration at a time when the preload was applied) until the thrust on the spring cartridge 8 becomes equal to the preload. Then, when the thrust exerted on the spring cartridge 8 from the worm 3 gradually increases and exceeds the preload, the spring cartridge 8 (substantially the disc springs 9) starts to be compressed, and the worm 3 moves to the side of the cap 21 with the compression of the spring cartridge 8. While the worm 3 is moving, the axial force on the valve shaft 1 increases and the pressing force from the valve element on the valve seat increases.

When the displacement of the worm 3 (that is, the amount of compression of the disc springs 9) reaches a prescribed value, the torque switch 13 is activated to stop the operation of the motor in order to prevent more excess torque from being transmitted to the valve shaft 1. The motor-operated valve is thereby protected from damage, and the valve element is kept pressed against the valve seat by the torque being applied thereto when operation of the motor is stopped to form a good seal between the valve element and the valve seat.

The operation at a time when the valve element is shifted from a closed state to a full open position is the same as the operation during the above closing operation except that the direction in which the worm 3 moves and the direction in which the spring cartridge 8 is compressed are opposite, and hence its description is omitted here. During the opening operation, the spring cartridge 8 receives a compression force from the nut 7 side with movement of the worm 3 since the washer 10 is constrained by the shoulder 18.

As described above, in the motor-operated valve, the application of additional torque after the valve element has abutted against the seat has great importance for improvement of the reliability of the motor-operated valve, for example, to ensure the ability to maintain the valve element in its full close or open state. Therefore, measuring the amount of compression of the spring cartridge 8 or the compression force on the spring cartridge 8 at a time when the torque switch 13 is activated and diagnosing the set torque based on the correspondence relation between the amount of compression and the compression force (which is proportional to torque) of the spring cartridge 8 (that is, spring characteristic) in order to maintain the torque on the worm wheel 2 at an appropriate level constantly is one of the most important points to be checked in various points to be diagnosed on the torque of the motor-operated valve. Therefore, it is vary important to correct the spring characteristic at times for diagnosis of the motor-operated valve. To maintain the torque at an appropriate level, one of diagnostic methods using a diagnosing device as described in the following embodiments is employed. The diagnostic methods using a motor-operated valve diagnosing device are described in detail with reference to FIG. 2 and subsequent drawings.

The motor-operated valve described below has a "spring compression mechanism," and employs a diagnostic method corresponding to the above "spring compression method" or "external torque sensor method."

(I) First Embodiment

FIG. 2 shows the valve element driving part of the motor-operated valve shown in FIG. 1, to which a spring compression mechanism X1 according to a first embodiment and constituting an essential part of the motor-operated valve diagnosing device is attached instead of the cap 21. The spring compression mechanism X1 has a structure which allows it to be temporarily attached to the valve element driving part whenever a diagnosis is carried out and to be permanently attached to the valve element driving part. The configuration of the valve element driving part has already been described in connection with FIG. 1 and hence its description is omitted here.

The spring compression mechanism X1 has a base 31 removably securable to the adapter 20, a pusher 35 attached to the axial center of the base 31, and a cylinder structural component 45 disposed at an end of the pusher 35 as described below.

The base 31 is in the shape of a bottomed, double-flanged cylinder and has a thick disc-shaped base portion 31a having a small-diameter bore 32 extending along its central axis, a cylindrical portion 31b extending cylindrically from one end of the base portion 31a and having a large-diameter bore 33 extending therethrough, a first flange portion 31c formed at an end of the base portion 31a, and a second flange portion 31d formed at an end of the cylindrical portion 31b. The cylindrical portion 31b of the base 31 has a slit-like opening 34 formed through a side wall thereof and extending axially.

The base 31 is removably attachable to the adapter 20 by securing the first flange portion 31c to the flange portion 20a of the adapter 20 by bolts 55.

The pusher 35 has a cylindrical portion 36 in the shape of a bottomed cylinder having a diameter sized to fit in the cylindrical portion 20b of the adapter 20, and a rod-shaped shaft portion 37 extending axially in a direction opposite the cylindrical portion 36 from the center of the bottom of the cylindrical portion 36, which are formed integrally with each other. The shaft portion 37 has a circular flange-like guide portion 38 at its axial intermediate portion. The part of the shaft portion 37 on the cylindrical portion 36 side from the guide portion 38 is slidably received in the small-diameter bore 32 of the base 31.

The guide portion 38 of the shaft portion 37 is slidably received in the large-diameter bore 33 of the base 31. The part of the shaft portion 37 outside the guide portion 38 functions as a cylinder rod, and a packing 52 is provided around an end thereof. The dimensional setting of the pusher 35 is described later.

The guide portion 38 of the shaft portion 37 has a projection-like extended portion 39 extending radially outward from a side part of its exterior, and the extended portion 39 extends outward through the opening 34 of the base 31.

The cylinder structural component 45 is constituted of an L-shape block and has an engaging portion 47 in the form of a wide annular recess in the exterior of its one end, and a deep sliding hole 44 opening in an end face thereof and extending axially along its central axis. An end of the shaft portion 37 of the pusher 35 is slidably received in the sliding hole 44 with the packing 52 interposed therebetween, and the sliding hole 44 and the end of the shaft portion 37 form a hydraulic cylinder. A pressure chamber 40 is defined between the bottom of the sliding hole 44 and the end of the shaft portion 37 of the pusher 35.

A manual hydraulic pump 50 with an operating handle 51 is attached to the other end of the cylinder structural component 45, and an oil passage 46 communicating the delivery port (not shown) of the hydraulic pump 50 and the pressure chamber 40 is formed through the cylinder structural component 45.

A load cell 41 (corresponding to the "compression force measuring means" in claims) is secured to the engaging portion 47 of the cylinder structural component 45. The cylinder structural component 45 is secured to the base 31 via the load cell 41 by securing the load cell 41 to the second flange portion 31d of the base 31 by bolts 56.

A linear gauge 42 (corresponding to the "compression amount measuring means" in claims) is attached to the load cell 41 via a bracket 48, and the linear gauge 42 has an operation element 43 in contact with the extended portion 39.

The guide portion 38 of the pusher 35 is in contact with an engaging portion 47 side end face 45a of the cylinder structural component 45 to determine the position of the pusher 35 in the retreat direction as shown in FIG. 2. The distance from an upper face of the adapter 20 to the distal end face of the cylindrical portion 36 of the pusher 35 in this position determined state is slightly smaller than the distance from the upper face of the adapter 20 to the distal end face of the cylindrical portion 21b of the cap 21 shown in FIG. 1 so that the distances are generally equal to each other. Even when such dimensional setting is made, measurement can be carried out without any problem and a spring characteristic of the spring cartridge 8 can be acquired by a simple operation as described below.

That is, in the device of this embodiment, no problem occurs even if there is a gap attributable to the dimensional setting between the distal end face of the cylindrical portion 36 of the pusher 35 and the washer 11 of the spring cartridge 8 when the spring compression mechanism X1 is assembled to the casing 15 via the adapter 20. When the pusher 35 is pushed forward by hydraulic pressure, the distal end face of the cylindrical portion 36 of the pusher 35 abuts against the washer 11 when the pusher 35 is moved the distance corresponding to the gap and then a compression force starts to be exerted on the spring cartridge 8. Then, compression of the spring cartridge 8 starts when the compression force exceeds a predetermined preload.

This is described in more detail with reference to FIG. 8. In FIG. 8, the horizontal axis represents the amount of compression of the spring cartridge 8 (which is expressed simply as "TSC compression amount") and the pusher displacement, and the vertical axis represents the compression force exerted on the spring cartridge 8. Here, the initial position of the pusher 35 is defined as "point a," and the position where the distal end face of the cylindrical portion 36 of the pusher 35 abuts against the washer 11 of the spring cartridge 8 is defined as "point b." The distance A between the point a and point b corresponds to the gap.

Until the distal end face abuts against the washer 11 after the pusher 35 has been pushed forward from the initial position "point a" (in the range A from the "point a" to the "point b"), the pusher 35 moves but the compression force on the spring cartridge 8 and the amount of compression of the spring cartridge 8 do not change at all. After the distal end face of the pusher 35 has reached the "point b" and abutted against the washer 11, the pusher 35 stays at the position (that is, "point b") until the pressing force caused by the hydraulic pressure reaches a value corresponding to the preload on the spring cartridge 8 (a compression force corresponding to a "point c"). During that time (from the "point b" to the "point"), only the compression force on the spring cartridge 8 increases and the amount of compression does not change at all.

When the pressing force increases beyond a value corresponding to the preload ("point c"), the pusher 35 moves compressing the spring cartridge 8 (in this case, the displacement of the pusher 35 and the amount of compression of the spring cartridge 8 are equal to each other). Along with it, both the amount of compression of the spring cartridge 8 and the compression force on the spring cartridge 8 increase (from the "point c" to a "point d"), and a torque curve is acquired.

It is a spring characteristic (or a torque curve) of the spring cartridge 8 that is intended to be essentially acquired by measurement using the spring compression mechanism X1, and it can be acquired easily and reliably with reference to the curve (the curve from the point b to point c, and to point d) in FIG. 8. For example, there is no need to adjust the position of the pusher 35 so that the distal end face of the pusher 35 can abut against the washer 11 at the start of measurement. Therefore, the measurement efficiency can be significantly improved in contrast to, for example, the conventional spring compression mechanism disclosed in Patent Document 2, in which the shape and function of the load meter are strictly limited and which requires fine positional adjustment before measurement.

From above, the spring cartridge 8 can be operated under the same conditions, whether during normal operation using the cap 21 as shown in FIG. 1 or during diagnosing operation using the base 31 (that is, the spring compression mechanism X1) as shown in FIG. 2.

Even when the distance from an upper surface of the adapter 20 to the distal end face of the cylindrical portion 36 of the pusher 35 is slightly smaller than the distance from the upper surface of the adapter 20 to the distal end face of the cylindrical portion 21b of the cap 21 so that the distances are generally equal to each other as described above, the motor-operated valve can be operated with the spring compression mechanism X1 permanently attached to the casing 15 when the pusher 35 is pressed forward by the distance corresponding to the difference in dimension between them and held at the position.

All the constitutional components of the spring compression mechanism X1 constituted as described above, that is, the base 31, the pusher 35, the cylinder structural component 45, the load cell 41 and the linear gauge 42 are integrated into a unitary structure, and can be attached to and removed from the casing 15 of the motor-operated valve via the adapter 20 as a unit.

In this case, since the load cell 41, which has an inner periphery engaged with the engaging portion 47 of the cylinder structural component 45 and integrated therewith and an outer periphery secured to the second flange portion 31d of the base 31 and integrated therewith, is disposed fixedly between the cylinder structural component 45 and the base 31, generation of signal noise due to movement of the sensor parts (load meter etc.) can be prevented and a reliable sensor signal can be acquired.

In this embodiment, the pusher 35 corresponds to the "compressing means" in claims, and the pusher 35, the cylinder structural component 45 and the hydraulic pump 50 constitutes the "hydraulic pressure driving mechanism" in claims.

A motor-operated valve diagnostic method using the spring compression mechanism X1 will be next described.

When a diagnosis of the motor-operated valve is carried out using the spring compression mechanism X1, the operation of the motor-operated valve is stopped in the state shown in FIG. 1 when the compression force on the spring cartridge 8 is not greater than the preload, and then the cap 21 is removed from the adapter 20. After that, the spring compression mechanism X1 is assembled to the adapter 20. That is, the cylindrical portion 36 of the pusher 35 is fitted into the cylindrical portion 20b of the adapter 20, the base 31 is placed on the upper surface of the adapter 20, and the base 31 is secured to the adapter 20 by the bolts 55. The attachment of the spring compression mechanism X1 to the adapter 20, that is, to the casing 15, is thereby completed.

In this state, the operating handle 51 is operated to pressure-feed hydraulic oil from the hydraulic pump 50 to the pressure chamber 40 through the oil passage 46. When hydraulic oil is press-fed into the pressure chamber 40, the pusher 35 is urged forward. Then, the urging force in the push-out direction on the pusher 35 caused by the hydraulic pressure reaches and exceeds a compression force corresponding to the preload on the spring cartridge 8, the spring cartridge 8 is pressed and compressed by the pusher 35.

At this time, since the base 31 and the cylinder structural component 45 are connected to each other via the load cell 41, the compression force on the spring cartridge 8 can be measured by the load cell 41 as an axial force exerted between the base 31 and the cylinder structural component 45. At the same time, the displacement of the pusher 35 is measured by the linear gauge 42 as the amount of compression of the spring cartridge 8.

Therefore, from the compression force on the spring cartridge 8 and the amount of compression of the spring cartridge 8 measured by the load cell 41 and the linear gauge 42, respectively, a spring characteristic of the spring cartridge 8 (or a torque curve representing the relation between the amount of compression of the spring cartridge 8 and torque) can be acquired. With reference to the spring characteristic, for example, by comparing the current preload on the spring cartridge 8 and the preload achieved at the previous diagnosis, the degree or tendency of change of the spring cartridge 8 with time and the timing of replacement of the spring cartridge 8 can be predicted.

Also, when the spring characteristic based on the compression force on the spring cartridge 8 and the amount of compression of the spring cartridge 8 acquired as described above is stored in a database, only the amount of compression of the spring cartridge 8 may be measured in the next and later diagnoses since the compression force on the spring cartridge 8 when the motor-operated valve is operating (which is proportional to the torque) can be read with reference to the database. As a result, simplification and speedup of a diagnosis on torque such as the set torque can be achieved. In particular, when the adapters 20 of the worm displacement measuring means and the spring compression mechanism X1 have the same shape so that they can be used interchangeably, the amount of compression of the spring cartridge 8 can be measured under the same conditions. As a result, a diagnosis on torque such as the set torque can be made with high accuracy.

Since the spring compression mechanism X1 is attachable to the casing 15 via the adapter 20, there is no need to modify or alter the valve element driving part including the spring cartridge 8 when the spring compression mechanism X1 is attached. Therefore, simplification of the diagnosis process and reduction in diagnosis cost can be achieved in contrast to conventional devices which require modification or alternation of these components, for example.

In addition, since there is no need to modify or alter the valve element driving part including the spring cartridge 8, the spring compression mechanism X1 can be shared by two or more motor-operated valves as long as at least the structure of the spring cartridge 8 is the same. Therefore, reduction in the expense for a diagnosis of a motor-operated valve, that is, diagnosis cost, can be achieved in contrast to the conventional case where each motor-operated valve needs to be provided with an exclusive spring compression mechanism.

Although the compression force on the spring cartridge 8 is measured with the load cell 41 in this embodiment, the method of measuring the compression force is not limited to the method using the load cell 41. For example, the compression force can be measured by measuring the hydraulic pressure in the pressure chamber 40. The compression force on the spring cartridge 8 is generated by the pressing force on the spring cartridge 8 from the pusher 35, and the pressing force is obtained as the product of the pressure receiving area of the pusher 35 (that is, the cross-sectional area at an end of the shaft portion 37 of the pusher 35) and the hydraulic pressure in the pressure chamber 40. Therefore, when the hydraulic pressure is measured, the compression force can be obtained based on the hydraulic pressure. More specifically, when a hydraulic pressure gauge (not shown) is attached to the spring compression mechanism X1 instead of the load cell 41, the hydraulic pressure in the pressure chamber 40 or the hydraulic pressure in the oil passage 46 can be measured with the hydraulic pressure gauge. The method of acquiring the compression force by measuring the hydraulic pressure in the pressure chamber 40 can be also applied to the embodiments described below.

(II) Second Embodiment

FIG. 3 shows the valve element driving part of the motor-operated valve shown in FIG. 1, to which a spring compression mechanism X2 according to a second embodiment and constituting an essential part of the motor-operated valve diagnosing device is attached instead of the cap 21. The configuration of the valve element driving part has been already described in connection with FIG. 1 and hence its description is omitted here.

The spring compression mechanism X2 of this embodiment has the same basic structure as the spring compression mechanism X1 of the first embodiment described above except that the spring compression mechanism X2 is provided with the function of the "external torque sensor method" which the spring compression mechanism X1 does not have. Therefore, the same components as those of the spring compression mechanism X1 are designated by the same reference numerals as used in FIG. 2, and their description is omitted here since their description in the first embodiment applies equally in this embodiment. Only the differences will be described below.

The spring compression mechanism X2 of this embodiment is provided with the function of the "external torque sensor method" which the spring compression mechanism X1 does not have so that a spring characteristic of the spring cartridge 8 in the motor-operated valve closing direction and a spring characteristic of the spring cartridge 8 in the motor-operated valve opening direction can be acquired by the single spring compression mechanism X2 for a more accurate diagnosis.

A small-diameter interlocking rod 61 slidably extends from the center of axis of the pusher 35 through the central axis of the cylinder structural component 45. The interlocking rod 61 has a receiving portion 62 at one end, and the receiving portion 62 is in contact with an end of the small-diameter cylindrical portion 6b of the movable shaft 6. A spring bearing 63 is mounted on an other end side part of the interlocking rod 61, and the other end of the interlocking rod 61 is connected to a differential displacement gauge 60 attached to the cylinder structural component 45. The interlocking rod 61 is constantly urged toward the movable shaft 6 by a spring 64 interposed between the spring bearing 63 and the differential displacement gauge 60 in a compressed state. Designated as 53 and 54 are packings for sealing a gap around the interlocking rod 61.

In a diagnosis of the motor-operated valve using the spring compression mechanism X2, the hydraulic pump 50 is activated when the motor-operated valve is in a stopped state to cause the pusher 35 to compress the spring cartridge 8, and the compression force on the spring cartridge 8 and the amount of compression of the spring cartridge 8 are measured with the load cell 41 and the linear gauge 42, respectively, as in the first embodiment.

When the motor-operated valve is operating, the measurement is carried out as described below. When the worm 3 is moved in the valve closing direction (to the right as views in FIG. 3) as the motor-operated valve is operating, the movable shaft 6 is moved together with the worm 3. Then, the spring cartridge 8 is compressed from the washer 10 side since the washer 11 side end thereof is restrained from moving by the pusher 35 of the spring compression mechanism X2. At this time, the amount of compression of the spring cartridge 8 is acquired by measuring the displacement of the movable shaft 6 with the differential displacement gauge 60.

The compression force on the spring cartridge 8 is transmitted from the washer 11 to the pusher 35 and then from the guide portion 38 of the pusher 35 to the cylinder structural component 45, and measured as a load between the cylinder structural component 45 and the base 31 by the load cell 41. Then, a spring characteristic of the motor-operated valve in the valve closing direction is acquired based on the compression force on the spring cartridge 8 and the amount of compression of the spring cartridge 8 measured by the load cell 41 and the differential displacement gauge 60, respectively.

According to the spring compression mechanism X2 of this embodiment, both a spring characteristic in the opening direction of the motor-operated valve and a spring characteristic in the closing direction of the motor-operated valve can be acquired as spring characteristics of the spring cartridge 8. Therefore, when the spring characteristics in both directions are stored in a database and the next and later diagnoses of the motor-operated valve are made based on the database, a diagnosis can be made with higher accuracy and reliability than is possible with the spring compression mechanism X1 of the first embodiment.

According to the spring compression mechanism X2 of this embodiment, the load cell 41 can measure both the compression force exerted on the spring cartridge 8 when the motor-operated valve is operating and the compression force exerted on the spring cartridge 8 by the pusher 35 when the motor-operated valve is in a stopped state. Therefore, cost reduction by labor saving, reduction of the number of parts and simplification of the structure can be achieved in contrast to the case where they are measured individually by separate means, for example.

Since the other effects than those described above are the same as those of the first embodiment and the description in the first embodiment applies equally in this embodiment, their description is omitted here.

(III) Third Embodiment

FIG. 4 shows the valve element driving part of the motor-operated valve, to which a spring compression mechanism X3 according to a third embodiment and constituting an essential part of the motor-operated valve diagnosing device is attached. The spring compression mechanism X3 is defined as a modification of the spring compression mechanism X1 of the first embodiment, and is the same in configuration as the spring compression mechanism X1 of the first embodiment except that the spring compression mechanism X3 of this embodiment has an electric hydraulic pump 57 including a motor as a pressurization source instead of the manual hydraulic pump 50 as a pressurization source of the spring compression mechanism X1 according to the first embodiment. Therefore, the same components as those of the spring compression mechanism X1 are designated by the same reference numerals as used in FIG. 2, and their description is omitted here since their description in the first embodiment applies equally in this embodiment. Only the differences will be described below.

The spring compression mechanism X3 of this embodiment has a control unit 58 to maximize the advantage of the electric hydraulic pump 57, and a compression characteristic of the spring cartridge 8 created by the spring compression mechanism X3 is made to correspond to a compression characteristic (changes with time in the compression force or the amount of compression) of the spring cartridge 8 stored in advance.

That is, a compression characteristic of the spring cartridge 8 acquired when the motor-operated valve is operating is inputted into and stored in the control unit 58. When a diagnosis is carried out using the spring compression mechanism X3 when the motor-operated valve is in a stopped state, the compression characteristic of the spring cartridge 8 stored in advance is read from the control unit 58. Then, the control unit 58 controls the rotational speed of the motor for driving the hydraulic pump 57 (which corresponds to the feed rate of hydraulic oil from the hydraulic pump 57) such that the changes with time in the compression force on the spring cartridge 8 or the amount of compression of the spring cartridge 8 measured by the load cell 41 or the linear gauge 42 will correspond to the above compression characteristic of the spring cartridge 8.

In this configuration, the changes with time in the compression force on the spring cartridge 8 and the amount of compression of the spring cartridge 8 are created by the spring compression mechanism X3 under the conditions corresponding to a compression characteristic of the spring cartridge 8 which is acquired when the motor-operated valve is actually operating. Therefore, the reliability of measured values is high, allowing a diagnosis with higher accuracy.

While the spring compression mechanism X3 constituted based on the spring compression mechanism X1 of the first embodiment and having the electric hydraulic pump 57 instead of the hydraulic pump 50 of the spring compression mechanism X1 is described as an example in this embodiment, the present invention is not limited thereto. This configuration is also applicable to other embodiments. For example, a spring compression mechanism of other embodiments constituted based on the spring compression mechanism X2 of the second embodiment employing an "external torque sensor method" and having an electric hydraulic pump 57 instead of the manual hydraulic pump 50 thereof is also possible.

(IV) Fourth Embodiment

FIG. 5 shows the spring cartridge 8 of the motor-operated valve, removed from the motor-operated valve and attached to a support tool 66, which will be described below. In this state, the compression force on the spring cartridge 8 and the amount of compression of the spring cartridge 8 are measured with the spring compression mechanism X1 of the first embodiment to acquire a spring characteristic thereof.

This embodiment is preferable when measurement is difficult to make with the spring cartridge 8 attached to the motor-operated valve using the spring compression mechanism X1 because of space limitations or when a spring characteristic of a replacement spring cartridge 8 is acquired in advance in case that the spring cartridge 8 currently used needs replacing because of changes with time. Also in this case, since the adapter 20 is provided and the spring compression mechanism X1 is attachable to the support tool 66 via the adapter 20, the spring compression mechanism X1 can be shared by two or more motor-operated valves having a spring cartridge 8 of the same structure.

The support tool 66 is basically produced to have the same structure as the valve element driving part of the motor-operated valve, and has a block with a prescribed size having a small-diameter portion 67 and a large-diameter portion 68 identical with the small-diameter bore 16 and the large-diameter bore 17, respectively, of the valve element driving part of the motor-operated valve, and a flange portion 69 at which the large-diameter portion 68 opens and to which the adapter 20 is securable by bolts 22.

The spring compression mechanism X1 is attached (set) to the adapter 20, and then attached (fixed) to the adapter 20 side (that is, the support tool 66) by bolts 55. In this state, the hydraulic pump 50 of the spring compression mechanism X1 is activated to cause the pusher 35 to compress the spring cartridge 8, and the compression force and the amount of compression at this time are measured with the load cell 41 and the linear gauge 42, respectively. Then, a spring characteristic of the spring cartridge 8 is acquired based on the measured values and used for a diagnosis of the motor-operated valve. Here, the same components as those of the spring compression mechanism X1 are designated in FIG. 5 by the same reference numerals as used in FIG. 2, and their description is omitted here since their description in the first embodiment applies equally in this embodiment.

In the spring compression mechanism X1 of this embodiment, the spring cartridge 8 removed from the motor-operated valve and in a separated state is attached to the support tool 66, and the spring compression mechanism X1 is attached to the flange portion 69 of the support tool 66 via the adapter 20. Thus, the spring cartridge 8 can be compressed externally by the spring compression mechanism X1 to measure the compression force on the spring cartridge 8 and the amount of compression of the spring cartridge 8, and, based on them, a spring characteristic of the spring cartridge 8 can be acquired. Therefore, a spring characteristic can be acquired with high accuracy in a diagnosis in a condition in which, for example, measurement cannot be made with the spring cartridge 8 assembled to the motor-operated valve.

Also, in this embodiment, the spring compression mechanism X1 is adapted to be attached to the support tool 66 via the adapter 20, the spring compression mechanism X1 can be shared by spring cartridges 8 without altering the support tool 66 as long as the spring cartridges 8 have the same structure.

In addition, the adapter 20 has a function of adjusting the dimensions of the support tool 66 and the spring compression mechanism X1 without requiring any change in the structure of the support tool 66 when the spring compression mechanism X1 is attached to the support tool 66, and the support tool 66 is configured to allow the spring cartridge 8 to be assembled thereto in the same state as that in which it is assembled to the valve element driving part. Therefore, adapters 20 of the same structure can be shared by the support tool 66 and the valve element, and reduction of diagnosis cost by shared use of the adapters 20 can be expected.

(V) Fifth Embodiment

FIG. 6 shows the valve element driving part, to which a laser sensor 70 for measuring the amount of compression of the spring cartridge 8 is attached via a support cylinder 71, which will be described below, as an example in which the adapter 20 is used to attach a diagnosing apparatus other than a spring compression mechanism.

The support cylinder 71 is in the shape of a flanged, double-diameter straight cylinder and has a small-diameter cylindrical portion 71a fittable into the inner bore of the adapter 20 and having a distal end face abuttable against the washer 11 of the spring cartridge 8 on one side in its axial direction, a large-diameter cylindrical portion 71b to which the laser sensor 70 is attachable via a sensor mounting stage 72 on the other side, and a flange portion 71c formed between the small-diameter cylindrical portion 71a and the large-diameter cylindrical portion 71b and extending radially outward.

The support cylinder 71 is securable to the casing 15 by securing the flange portion 71c to the adapter 20 by bolts 23 with the small-diameter cylindrical portion 71a fitted in the inner bore of the adapter 20 and its distal end face in contact with the washer 11 of the spring cartridge 8. When the support cylinder 71 is attached to the casing 15, a detection part of the laser sensor 70 faces the top face of the nut 7 attached to an end of the movable shaft 6 through the inner space in the support cylinder 71, and the laser sensor 70 measures the displacement of the movable shaft 6, which moves with operation of the motor-operated valve, that is, the amount of compression of the spring cartridge 8, as the displacement of the nut 7.

Since the laser sensor 70 is attachable via the adapter 20 attached to the casing 15 as described above, any of the spring compression mechanisms X1 to X3 and the laser sensor 70 can be selectively attached to the valve element driving part without altering the valve element driving part including the spring cartridge 8. Therefore, if the amount of compression of the spring cartridge and the compression force on the spring cartridge are acquired by measurement and the correlation between them, that is, a torque curve, is stored in a database, for example, when only the amount of compression of the spring cartridge can be measured with the laser sensor 70, the compression force corresponding to the measured amount of compression can be acquired and the torque curve can be corrected in the next and later diagnoses. As a result, simplification and speedup of a diagnosis on torque such as the set torque can be achieved.

(VI) Sixth Embodiment

FIG. 7 shows the valve element driving part, to which a differential displacement gauge 80 is attached via a support cylinder 81, which will be described below, instead of the laser sensor 70, as another example in which the adapter 20 is used to attach a diagnosing apparatus other than a spring compression mechanism.

The support cylinder 81 is in the shape of a flanged, double-diameter straight cylinder and has a large-diameter cylindrical portion 81a fittable into the inner bore of the adapter 20 and having a distal end face abuttable against the washer 11 of the spring cartridge 8 on one side in its axial direction, a small-diameter cylindrical portion 81b to which the differential displacement gauge 80 is attachable on the other side, and a flange portion 81c formed between the large-diameter cylindrical portion 81a and small-diameter cylindrical portion 81b and extending radially outward.

A rod-shaped operation element 82 extends through the central axis of the small-diameter cylindrical portion 81b. One end of the operation element 82 is abuttable against the outer end of the movable shaft 6, and the other end of the operation element 82 is connected to the differential displacement gauge 80 attached to an outer end of the small-diameter cylindrical portion 81b. The operation element 82 is constantly urged to the large-diameter cylindrical portion 81a side by a spring 83.

The support cylinder 81 is securable to the casing 15 by securing the flange portion 81c to the adapter 20 by bolts 23 with the large-diameter cylindrical portion 81a fitted in the inner bore of the adapter 20 and its distal end face in contact with the washer 11 of the spring cartridge 8. When the support cylinder 81 is attached to the casing 15, the operation element 82 is in contact with the outer end of the movable shaft 6 by the urging force of the spring 83, and movable axially together with the movable shaft 6 with displacement of the movable shaft 6 in the axial direction. The displacement of the operation element 82 in the axial direction is measured by the differential displacement gauge 80 as the amount of compression of the spring cartridge.

Since the differential displacement gauge 80 is attachable via the adapter 20 attached to the casing 15 as described above, any of the spring compression mechanisms X1 to X3 and the differential displacement gauge 80 can be selectively attached to the valve element driving part without altering the valve element driving part including the spring cartridge 8. Therefore, as is the case with the laser sensor 70, if the amount of compression of the spring cartridge and the compression force on the spring cartridge are acquired by measurement and the correlation between them, that is, a torque curve, is stored in a database, for example, when only the amount of compression of the spring cartridge can be measured with the differential displacement gauge 80, the compression force corresponding to the measured amount of compression can be acquired and the torque curve can be corrected in the next and later diagnoses. As a result, simplification and speedup of a diagnosis on torque such as the set torque can be achieved.

(VII) Seventh Embodiment

FIG. 9 shows an operating state of a motor-operated valve having the same structure as the motor-operated valve shown in FIG. 1. A cap 21 is attached via an adapter 20 having an oil leakage preventing function to the valve element driving part of the motor-operated valve. FIG. 10 shows the state of the motor-operated valve, to which a spring compression mechanism X4 is attached instead of the cap 21, during a diagnosis. Since the components of the spring cartridge 8 other than the adapter 20 and the cap 21 have the same configuration as those of the first embodiment shown in FIG. 1, the same components are designated by the same reference numerals as used in FIG. 1 and detailed description of their structures and so on is omitted here.

The reason why the adapter 20 is provided with an oil leakage preventing function will be described below.

As shown in FIG. 15, in a valve element driving part of a motor-operated valve, a spring cartridge 103 having a plurality of disc springs 110 sandwiched between a pair of front and rear washers 104 and 105 and mounted on a small-diameter portion 111a of a movable shaft 11 is fitted in a fitting hole 108 of a casing 102, and an integrated cap 101 having a main body 101a, a circular cylindrical portion 101b and a flange portion 101c is attached to an end of the fitting hole 108 by securing the flange portion 101c to an end face 102a of the casing 102 by bolts 106 with the circular cylindrical portion 101b fitted in the fitting hole 108. When the cap 101 is attached, the distal end face of the circular cylindrical portion 101b is in contact with the washer 105 of the spring cartridge 103, whereby one end of the spring cartridge 103 is positioned in place and the spring cartridge 103 can be compressed axially outward (to the right in the drawing).

The part in which the spring cartridge 103 is fitted is sealingly filled with a high viscosity lubricating oil such as grease, and the lubricating oil is prevented from leaking by the cap 101 during normal operation of the motor-operated valve. That is, the cap 101 has a function of positioning the spring cartridge 103 and a function of preventing lubricating oil from leaking.

However, when a diagnosis of the motor-operated valve is carried out, the cap 101 is removed from the valve element driving part and a diagnosing apparatus such as a spring compression mechanism is attached instead to the valve element driving part. Therefore, the lubricating oil leakage preventing function of the cap 101 is lost and the lubricating oil may leak from the spring cartridge 103 side to the outside when the diagnosing apparatus is attached or removed. In this case, since the lubricating oil has relatively high viscosity and low flowability, it does not flow out suddenly when the cap 101 is removed. However, the lubricating oil may gradually flow out as time goes by and may contaminates the area around the motor-operated valve to the extent that the working safety is endangered or the working environment is deteriorated. In addition, the amount of lubricating oil to be replenished after a diagnosis increases, resulting in an increase in the diagnosis cost.

In a radiation controlled area of a nuclear power plant, such leakage of lubricating oil from a motor-operated valve may lead to adhesion of radioactive substances to the leaked oil or an increase of radioactive waste.

In view of the above circumstances, the adapter 20 is provided with an oil leakage preventing function in this embodiment.

In this embodiment, as shown in FIG. 9 and FIG. 10, the adapter 20 is in the shape of a flanged cylinder and has a flange portion 20a and a cylindrical portion 20b. The cylindrical portion 20b has a wall formed integrally therewith and having a circular hole 27 offset upward from the central axis of the cylindrical portion 20b at its outer end. The part of the wall under the circular hole 27 serves as a weir 26.

An intermediate body 25 in the shape of a bottomed cylinder is slidably received in the adapter 20 with its bottom wall 25a facing the weir 26 of the adapter 20. The bottom wall 25a of the intermediate body 25 has a circular opening 25b located on the central axis of the intermediate body 25. When a differential displacement gauge as a worm displacement measuring means is attached via the adapter 20 as in the eighth embodiment described next, the opening 25b is used as a through-hole through which for an operation element of the differential displacement gauge can extend. When a laser sensor as a worm displacement measuring means is attached via the adapter 20 as in a ninth embodiment, the opening 25b is used as a projection hole through which a laser beam can pass.

When the intermediate body 25 is received in the adapter 20, a shoulder of the bottom wall 25a of the intermediate body 25 abuts against a shoulder of the weir 26 of the adapter 20, whereby positioning (restriction of relative movement) of the intermediate body 25 on one side in the axial direction (that is, the weir 26 side) with respect to the adapter 20 is achieved.

The intermediate body 25 is relatively movable to the other side in the axial direction with respect to the adapter 20 (in the direction in which the intermediate body 25 slides axially inward out of the adapter 20).

The adapter 20 is integrally assembled to the casing 15 with the intermediate body 25 incorporated therein and secured to the end face 15a of the casing 15 by bolts 22.

During normal operation of the motor-operated valve, the cap 21 is threadedly fixed to the outer end of the adapter 20 and covers the weir 26 as shown in FIG. 9. When the cap 21 is attached, the outer end of the spring cartridge 8 is completely closed by the cap 21. Thus, when the motor-operated valve is operated in this state, the lubricating oil filled in the spring cartridge 8 does not leak to the outside.

When the spring compression mechanism X4 is attached to the adapter 20 as shown in FIG. 10 to carry out, for example, a diagnosis of the set torque of the motor-operated valve, the cap 21 needs to be removed from the adapter 20 prior to it. In this case, since the oil leakage preventing function of the cap 21 is lost when the cap 21 is removed, the lubricating oil filled in the spring cartridge 8 may leak to the outside.

In such a case, however, since the weir 26 is provided at the outer end of the adapter 20 in this embodiment, the weir 26 fulfills its function as a weir and prevents the lubricating oil filled in the spring cartridge 8 from leaking to the outside through the adapter 20. Although the weir 26 has the opening 27, only a very small amount of lubricating oil can leak through the opening 27 of the weir 26 because of the high viscosity of the lubricating oil.

As a result, contamination of the area around the motor-operated valve by leaked lubricating oil can be prevented from occurring, and the working safety and good work environment are ensured. Also, since no leakage of lubricating oil occurs, the amount of lubricating oil to be replenished after the operation can be reduced, and thus reduction of the expense for a diagnosis of the motor-operated valve can be achieved.

In addition, since leakage of lubricating oil is prevented by a weir, which is simple in structure and can be formed inexpensively, this configuration is economical and assures reduction of the expense for prevention of leakage of lubricating oil in contrast to the case where a shaft sealing structure having a high sealability is used.

Moreover, as the intermediate body 25 is provided on the adapter 20 side, the following effects can be achieved.

First, since the intermediate body 25 is provided on the adapter 20 side, the relative positional relation between the intermediate body 25 and the spring cartridge 8 is the same during normal operation of the motor-operated valve when the cap 21 is attached to the adapter 20, and during a diagnosis of the motor-operated valve when the spring compression mechanism X4 is attached to the adapter 20. Therefore, since a diagnosis of the motor-operated valve can be made under the same conditions as those during normal operation, a diagnosis with high reliability and high accuracy corresponding to actual operating conditions can be achieved.

Secondly, since the intermediate body 25 does not provided on the side of the spring compression mechanism X4, which is attached to the adapter 20 during a diagnosis, the structure of the spring compression mechanism X4 can be simplified in contrast to the case where the intermediate body 25 is provided on the spring compression mechanism X4 side, for example. As a result, reduction in size, weight and production cost of the spring compression mechanism X4 can be achieved and, therefore, improvement of operating efficiency during a diagnosis and reduction in the operation cost can be achieved.

The adapter 20 includes the intermediate body 25, and a plurality of different functions are divided between them. That is, the adapter 20 has a function of allowing the spring compression mechanism X4 to be attached to the valve element driving part and a function of preventing leakage of lubricating oil from the spring cartridge 8, and the intermediate body 25 has a function of positioning an end of the spring cartridge 8.

As a result of the functional division, specific effects as described below can be achieved. First, the intermediate body 25 has a function of positioning the spring cartridge 8 as a conventional cap 101 shown in FIG. 15. In contrast to the fact that the cap 101 has a relatively large size and is integrally formed by forging, the intermediate body 25 can be formed with high accuracy by a cutting process. Therefore, at the time of replacement of the spring cartridge 8 or the like involving removal and attachment of the adapter 20, positioning of the spring cartridge 8 with the intermediate body 25 can be reproduced with higher accuracy. As a result, the amount of play in the spring cartridge 8 can be controlled easily and, therefore, improvement in the accuracy of diagnosis of the motor-operated valve can be expected.

Secondly, the cap 21 is removed from the adapter 20 and the spring compression mechanism X4 is instead attached prior to a diagnosis of the motor-operated valve. In this case, the cap 21 is formed separately from the adapter 20 and the intermediate body 25, and required only to fulfill the function of preventing leakage of lubricating oil during normal operation. Since the cap 21 is smaller in size and weight and easier to handle than the conventional cap 101 having both a function of preventing leakage of lubricating oil and a function of positioning the spring cartridge 103 as shown in FIG. 15, for example, improvement in the operating efficiency and reduction of the operation cost can be achieved.

Referring now to FIG. 10, the structure and so on in the state where a spring compression mechanism X4 is attached to the adapter 20 instead of the cap 21 to carry out a diagnosis of the set torque of a motor-operated valve is descried briefly. The spring compression mechanism X4 has the same basic structure as the spring compression mechanism X1 of the first embodiment (see FIG. 2) except that the weir 26 is provided integrally with the adapter 20, and that the intermediate body 25 is provided in the adapter 20 and the structure of the pusher 35 is simplified since the intermediate body 25 functions similarly to the cylindrical portion 36 of the pusher 35 in the spring compression mechanism X1.

The spring compression mechanism X4 has a base 31 removably securable to the adapter 20, a pusher 35 attached to the axial center of the base 31, and a cylinder structural component 45 disposed at an end of the pusher 35.

The base 31 is in the shape of a bottomed, double-flanged cylinder and has a thick disc-shaped base portion 31a having a small-diameter bore 32 extending along its central axis, a cylindrical portion 31b extending cylindrically from one end of the base portion 31a and having a large-diameter bore 33 extending therethrough, a first flange portion 31c formed at an end of the base portion 31a, and a second flange portion 31d formed at an end of the cylindrical portion 31b. The cylindrical portion 31b of the base 31 has a slit-like opening 34 formed through a side wall thereof and extending axially.

The pusher 35 has a rod-shaped shaft portion 37, and a disc-shaped contact portion 37a abuttable against the bottom wall 25a of the intermediate body 25 of the adapter 20 at an end of the shaft portion 37. The shaft portion 37 has a circular flange-like guide portion 38 at its axial intermediate portion. The part of the shaft portion 37 on the contact portion 37a side from the guide portion 38 is slidably received in the small-diameter bore 32 of the base 31.

The guide portion 38 of the shaft portion 37 is slidably received in the large-diameter bore 33 of the base 31. The part of the shaft portion 37 outside the guide portion 38 functions as a cylinder rod, and a packing 52 is provided around an end thereof.

When the spring compression mechanism X4 is attached via the adapter 20, the contact portion 37a at an end of the pusher 35 is inserted toward the intermediate body 25 through the opening 27 of the adapter 20 until the contact portion 37a abuts against the bottom wall 25a of the intermediate body 25.

Since the components other than the pusher 35 have the same configuration and function as those of the spring compression mechanism X1 of the first embodiment and their description in the first embodiment applies equally in this embodiment, their description is omitted here.

In this embodiment, when the spring compression mechanism X4 is activated and the pusher 35 is pressed forward, the displacement of the pusher 35 is transmitted to the intermediate body 25 via the contact portion 37a of the pusher 35. Then, the intermediate body 25 is moved toward the spring cartridge 8 and the spring cartridge 8 is compressed.

At this time, the compression force exerted on the spring cartridge 8 is measured by the load cell 41. At the same time, the displacement of the pusher 35 is measured by the linear gauge 42 as the amount of compression of the spring cartridge 8. From the compression force on the spring cartridge 8 and the amount of compression of the spring cartridge 8 separately measured as above, a spring characteristic of the spring cartridge 8 (or a torque curve representing the relation between the amount of compression of the spring cartridge 8 and torque) can be acquired. In addition, with reference to the spring characteristic, for example, by comparing the current preload on the spring cartridge 8 and the preload achieved at the previous diagnosis, the degree or tendency of change of the spring cartridge 8 with time and the timing of replacement of the spring cartridge 8 can be predicted as in the first embodiment.

(VIII) Eighth Embodiment

FIG. 12 shows the valve element driving part of a motor-operated valve having the same structure as the motor-operated valve shown in FIG. 1, to which a spring compression mechanism X5 is attached via an adapter 20 having an oil leakage preventing function. The spring compression mechanism X5 can be obtained by providing the spring compression mechanism X4 of the seventh embodiment shown in FIG. 10 with the differential displacement gauge 60 of the second embodiment shown in FIG. 3. The interlocking rod 61 of the differential displacement gauge 60 protrudes toward the spring cartridge 8 through the circular hole 27 of the adapter 20 and the opening 25b formed through the bottom wall 25a of the intermediate body 25, and the receiving portion 62 provided at an end of the interlocking rod 61 and is in contact with an end face of the movable shaft 6. That is, in this embodiment, the circular hole 27 of the adapter 20 and the opening 25b of the intermediate body 25 are both used as through-holes for the interlocking rod 61 and the receiving portion 62 of the differential displacement gauge 60.

Since the configuration and effects of the spring compression mechanism X5 are the same as those of the spring compression mechanism in the second embodiment and the seventh embodiment described before, corresponding components in FIG. 12 are designated by the same reference numerals as used in FIG. 3 and FIG. 10. Since the description of the components in the second embodiment and the seventh embodiment applies equally in this embodiment, detailed description of their structures and so on is omitted here.

(IX) Ninth Embodiment

FIG. 13 shows the valve element driving part of a motor-operated valve having the same structure as the valve element driving part shown in FIG. 1, to which the laser sensor 70 of the fifth embodiment shown in FIG. 6 is attached via the adapter 20 having an oil leakage preventing function. A laser beam emitted from the laser sensor 70 is projected onto the top face of the nut 7 of the spring cartridge 8 through the circular hole 27 of the adapter 20 and the opening 25b formed through the bottom wall 25a of the intermediate body 25. That is, in this embodiment, the circular hole 27 of the adapter 20 and the opening 25b of the intermediate body 25 are both used as projection holes for the laser beam emitted from the laser sensor 70.

Since the configuration and effects of the laser sensor 70 are the same as those of the laser sensor 70 in the fifth embodiment described before, corresponding components in FIG. 13 are designated by the same reference numerals as used in FIG. 6. Since the description of the components in the fifth embodiment applies equally in this embodiment, detailed description of their structures and so on is omitted here.

DESCRIPTION OF REFERENCE NUMERALS AND SYMBOLS

Figure 1:
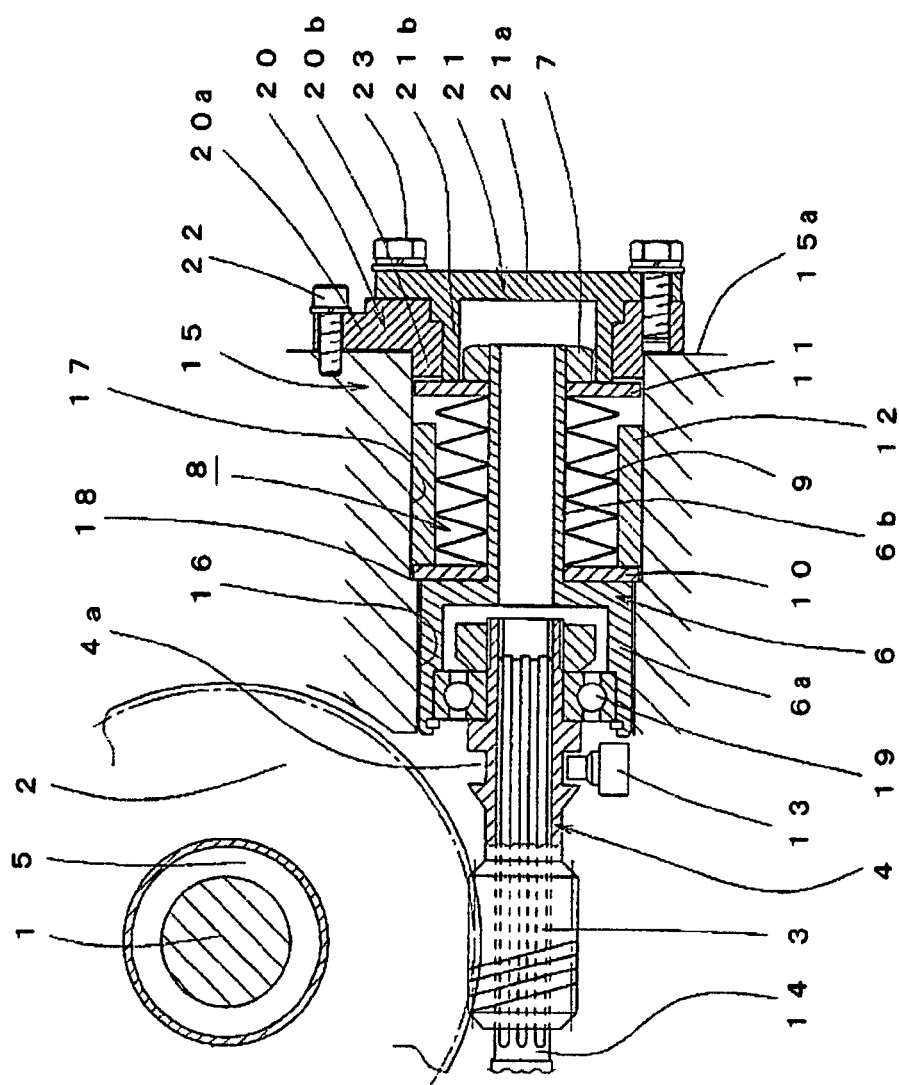
FIG. 1 is a cross-sectional view illustrating the structure of a valve element driving part of a motor-operated valve during normal operation.
Figure 2:
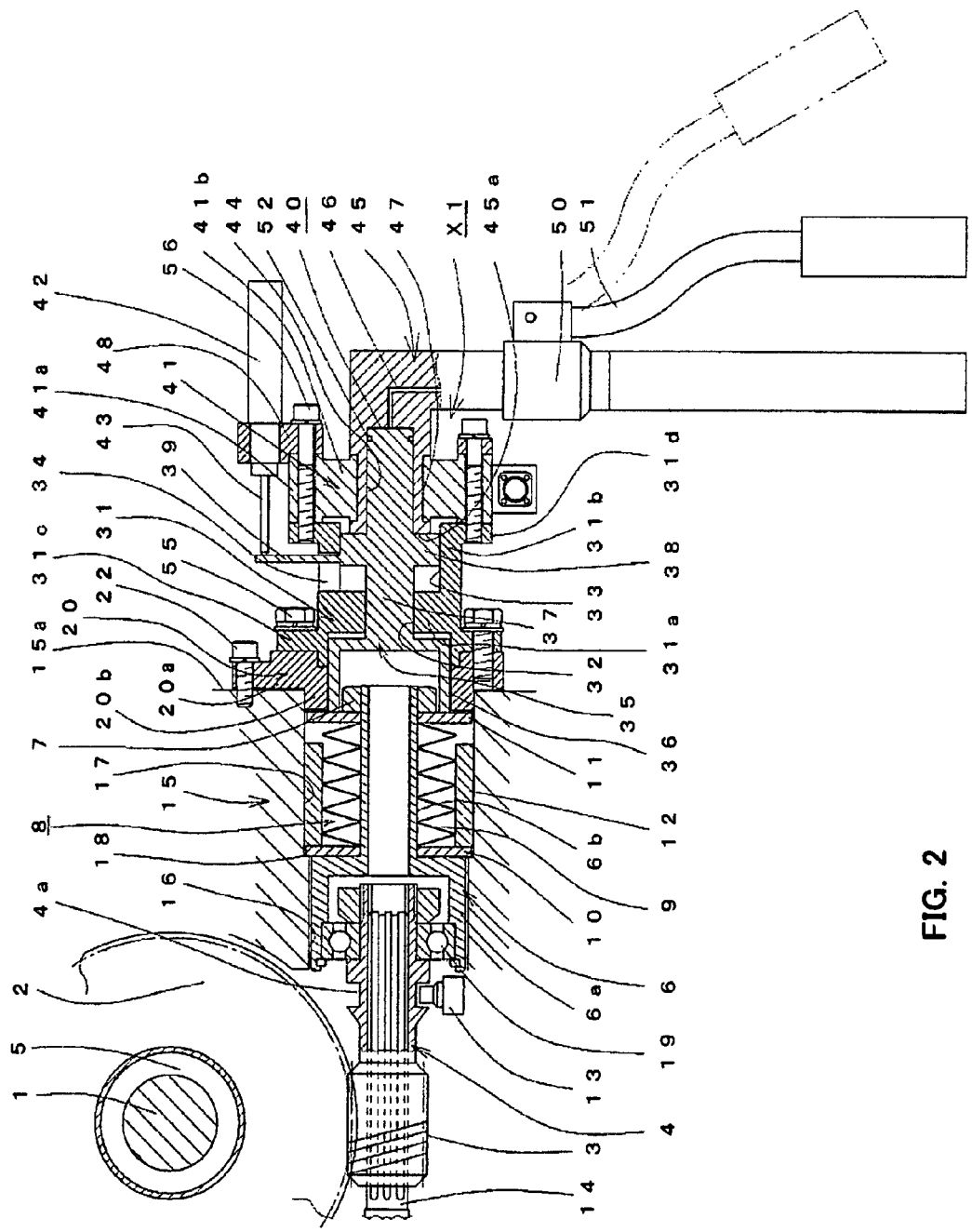
FIG. 2 is a cross-sectional view illustrating the valve element driving part shown in FIG. 1, to which a spring compression mechanism constituting an essential part of a motor-operated valve diagnosing device according to a first embodiment of the present invention is attached.
Figure 3:
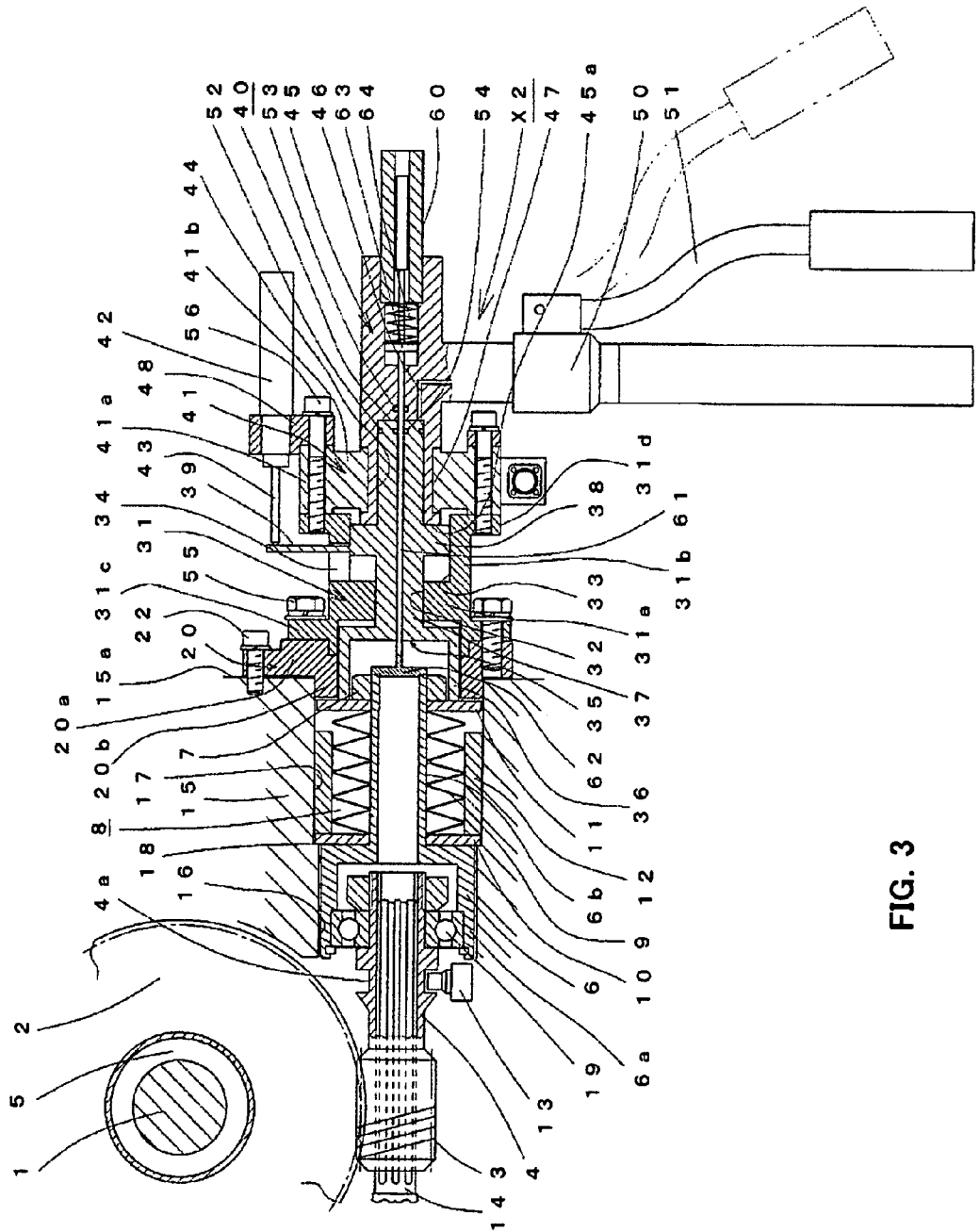
FIG. 3 is a cross-sectional view illustrating the valve element driving part shown in FIG. 1, to which a spring compression mechanism constituting an essential part of a motor-operated valve diagnosing device according to a second embodiment of the present invention is attached.
Figure 4:
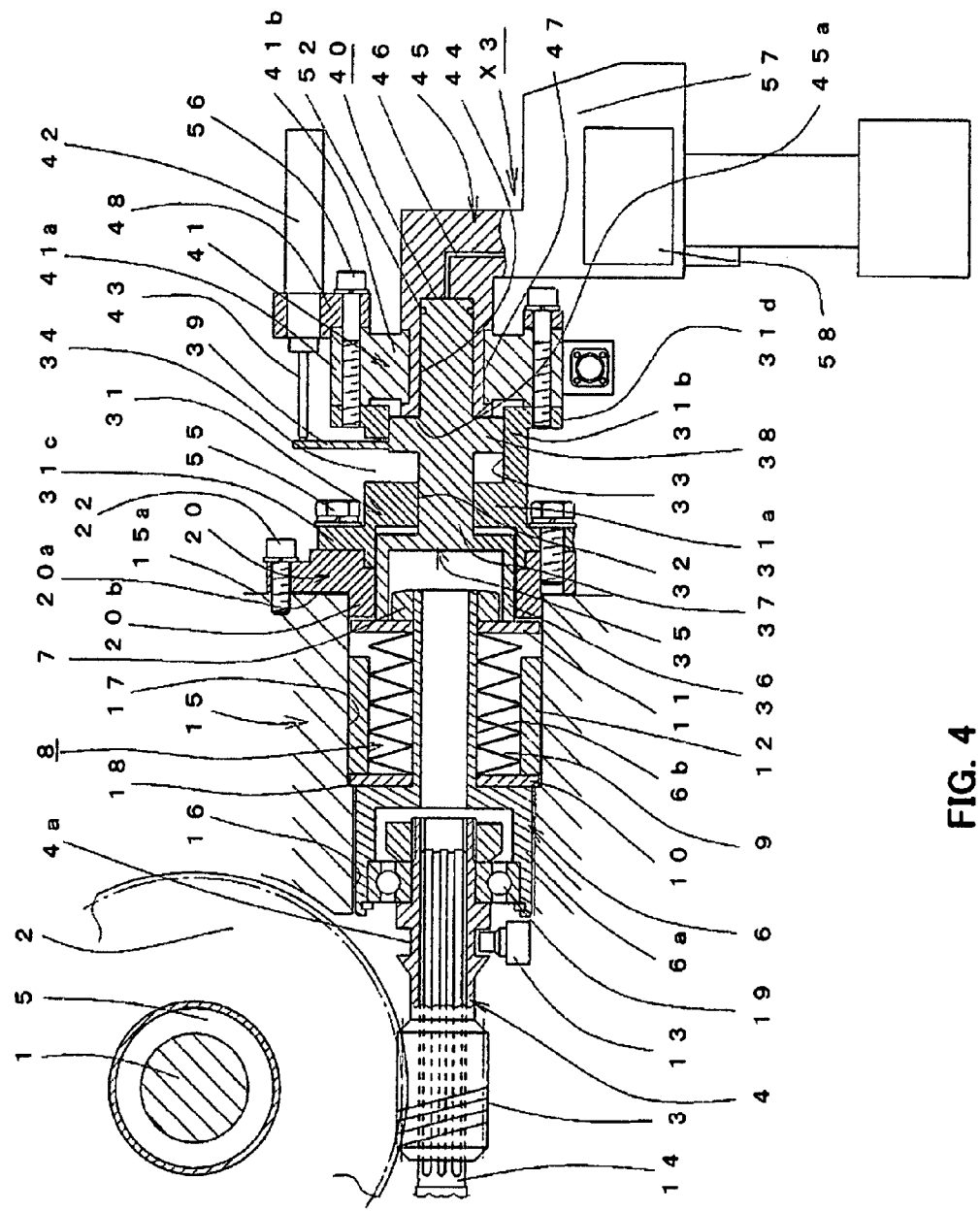
FIG. 4 is a cross-sectional view illustrating the valve element driving part shown in FIG. 1, to which a spring compression mechanism constituting an essential part of a motor-operated valve diagnosing device according to a third embodiment of the present invention is attached.
Figure 5:
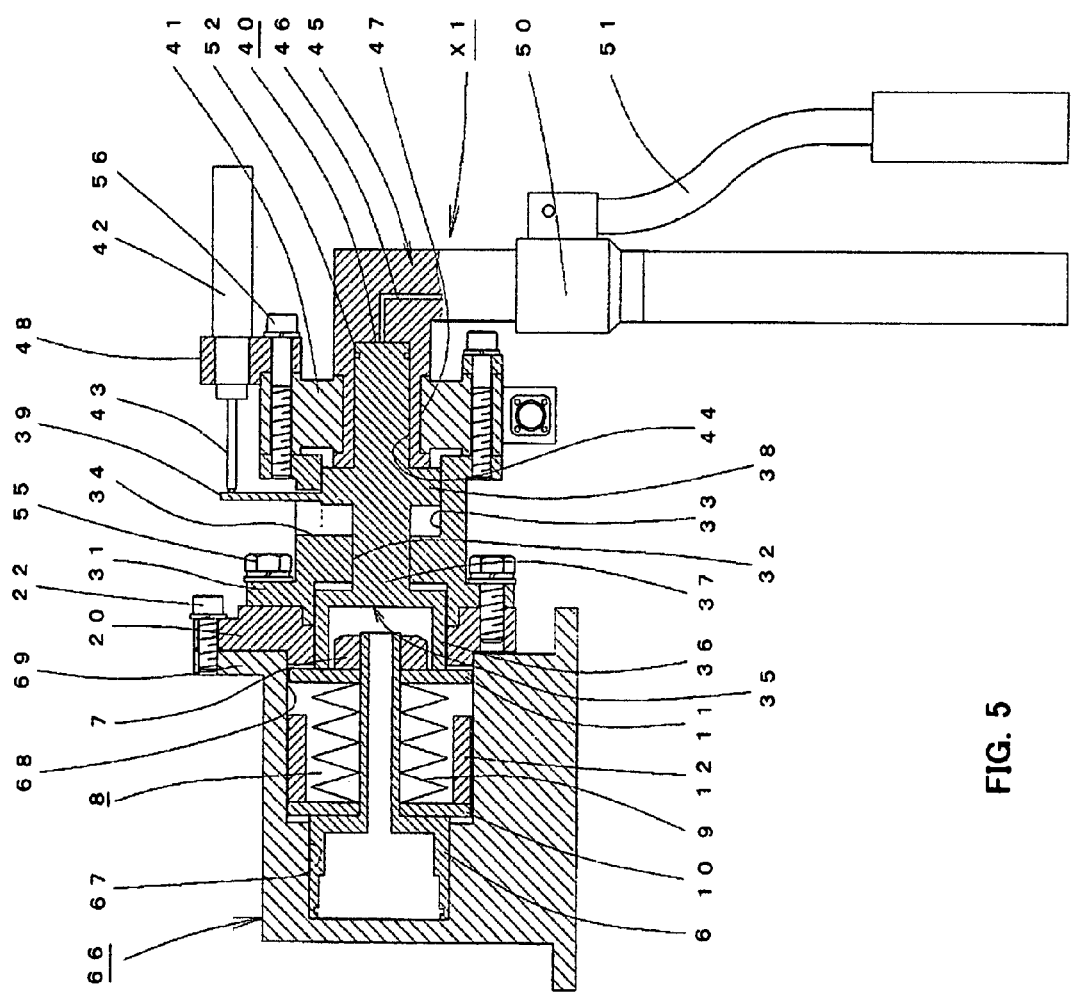
FIG. 5 is a cross-sectional view illustrating the manner of a diagnosis of a spring cartridge removed from the valve element driving part using a spring compression mechanism.
Figure 6:
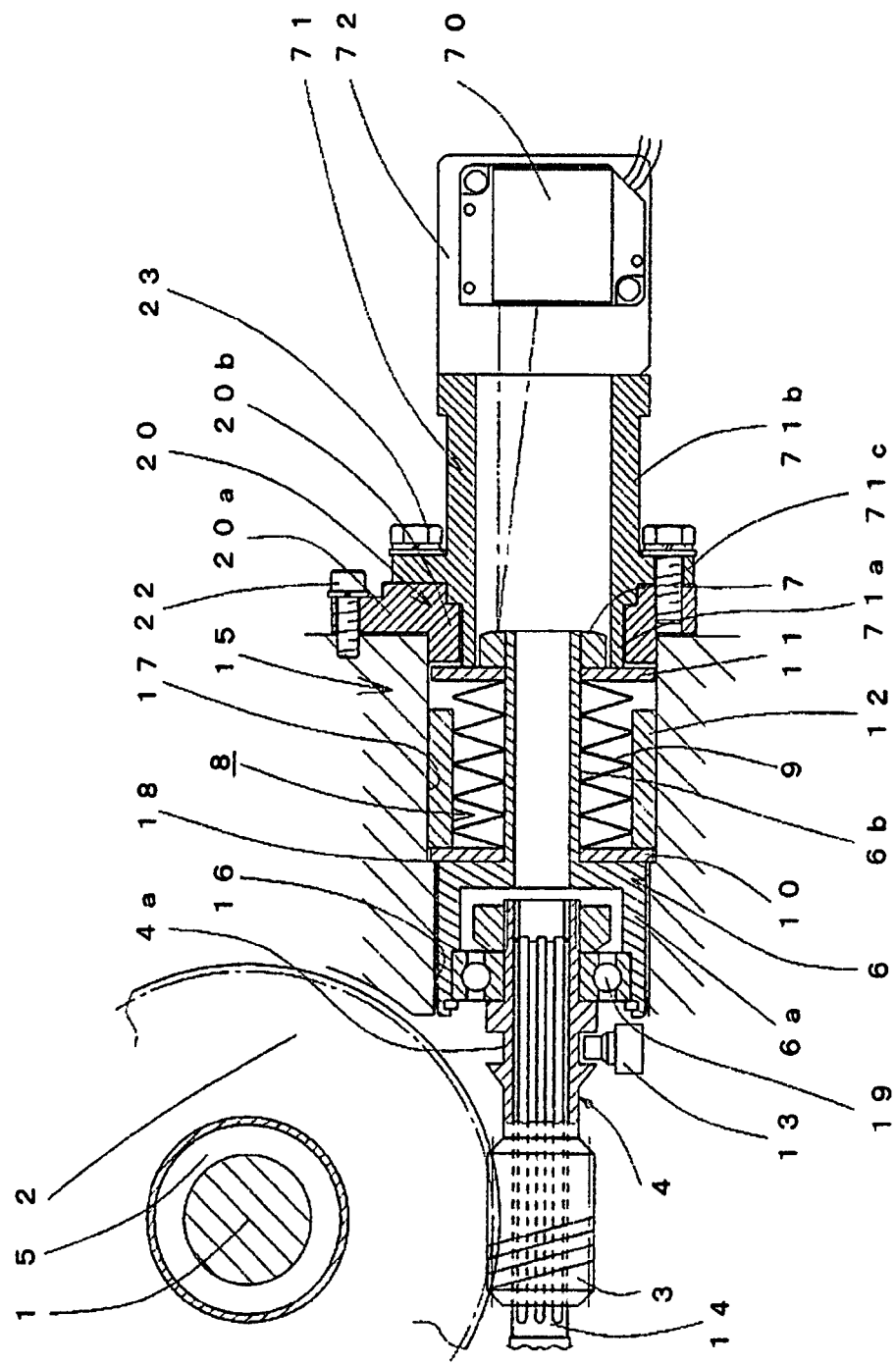
FIG. 6 is a cross-sectional view illustrating the valve element driving part, to which a laser sensor is attached.
Figure 7:
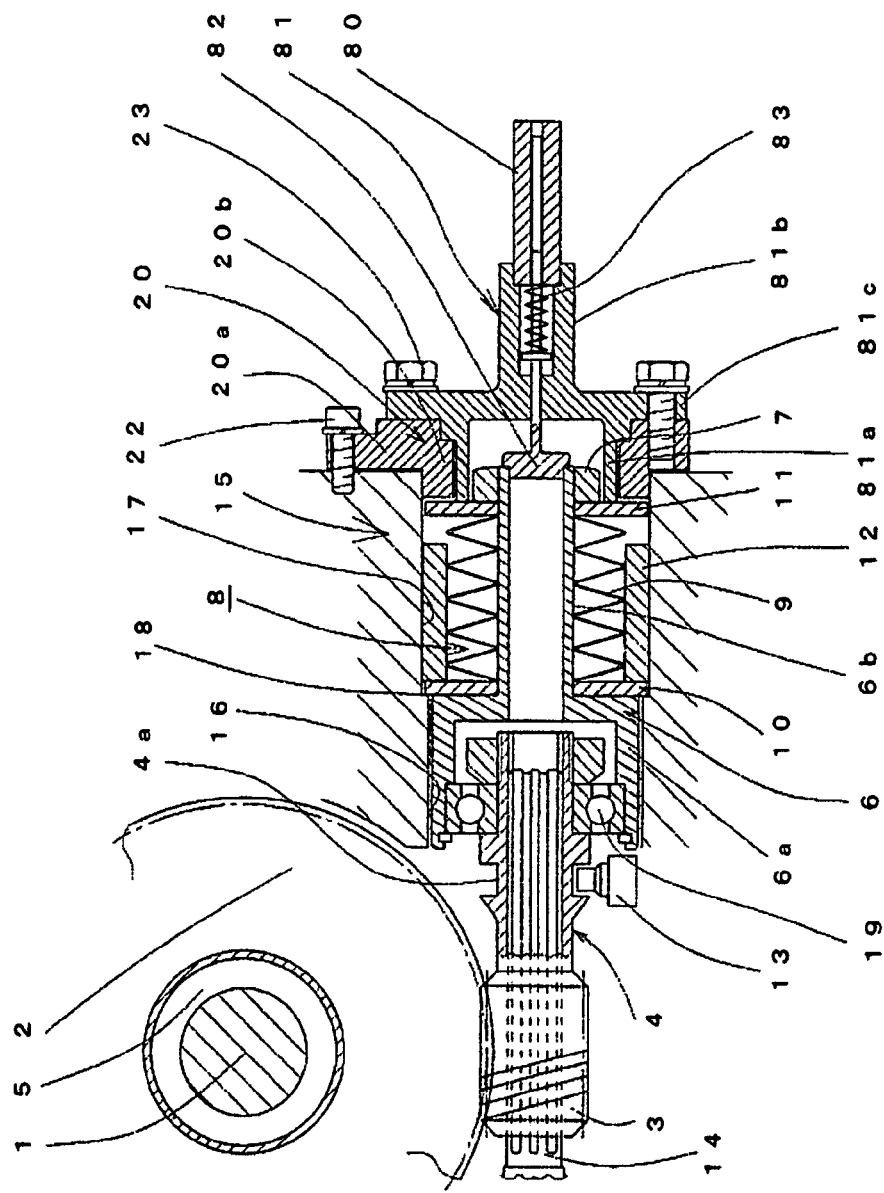
FIG. 7 is a cross-sectional view illustrating the valve element driving part, to which a differential displacement gauge is attached.
Figure 8:
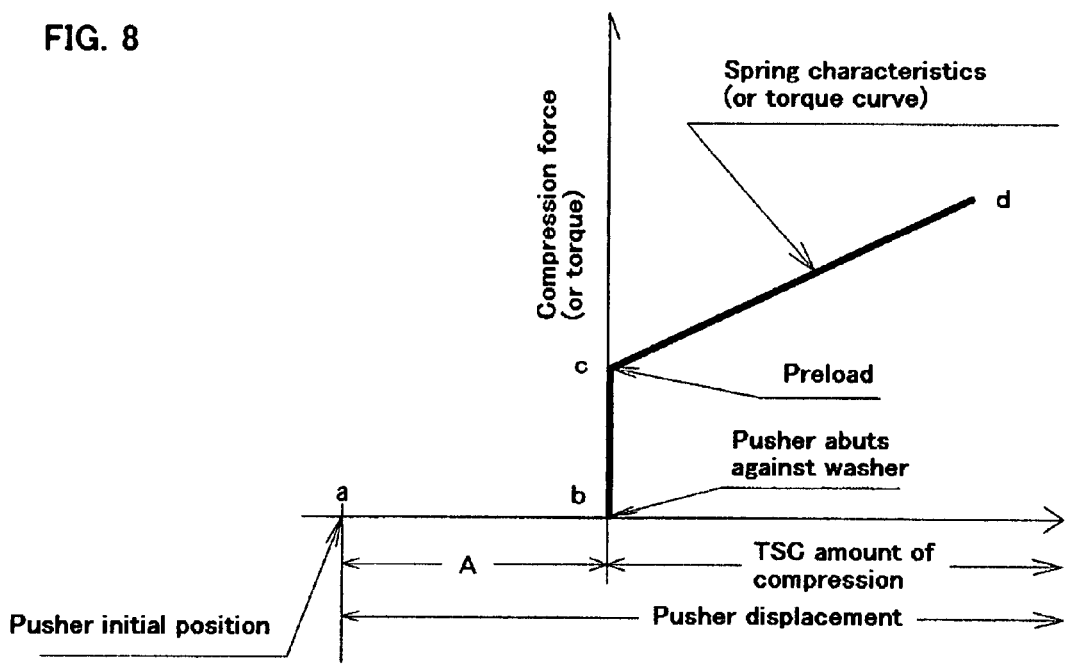
FIG. 8 is an explanatory view of a method for acquiring a spring characteristic of a spring cartridge.
Figure 9:
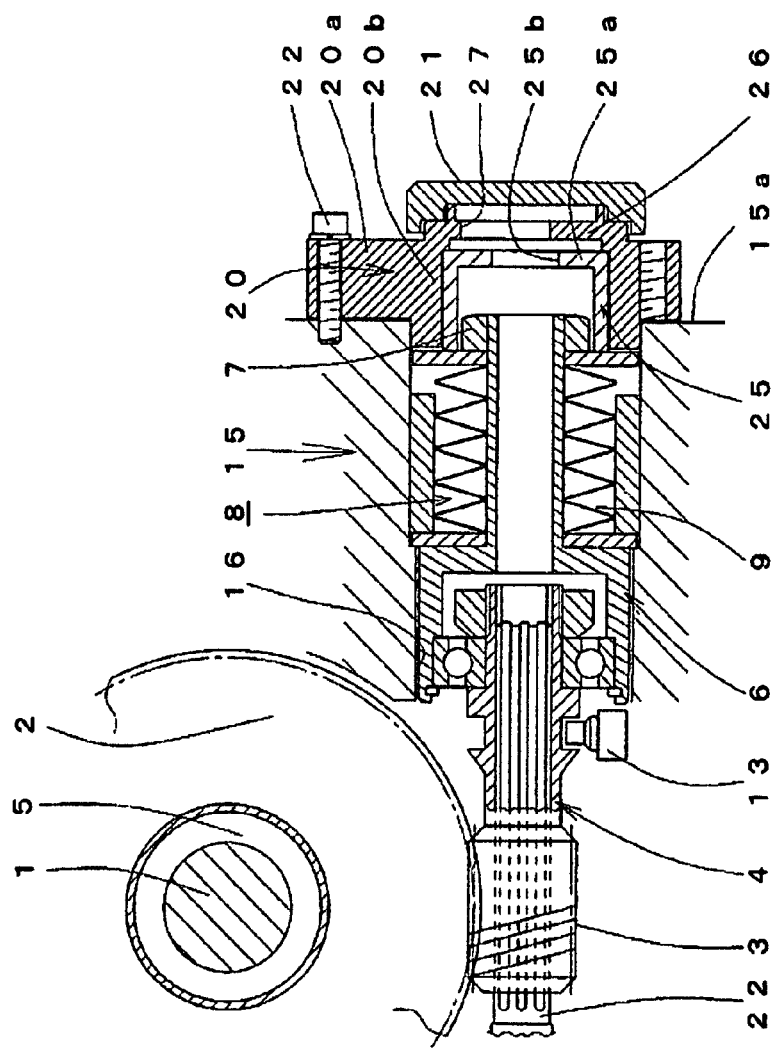
FIG. 9 is a cross-sectional view illustrating the structure of a valve element driving part during normal operation, provided with an adapter having an oil leakage preventing function.
Figure 10:
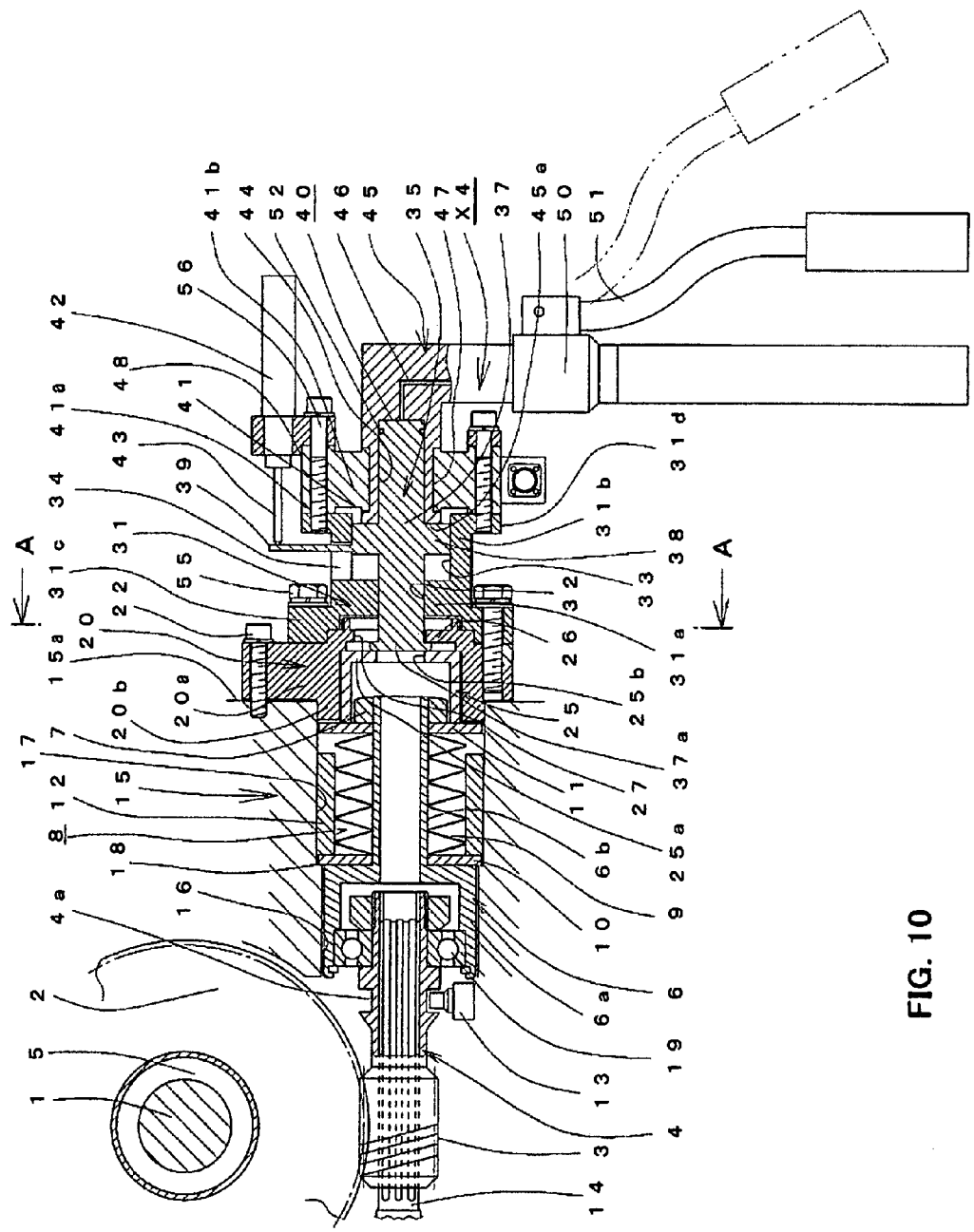
FIG. 10 is a cross-sectional view illustrating the valve element driving part, to which a spring compression mechanism is attached via an adapter having an oil leakage preventing function.
Figure 11:
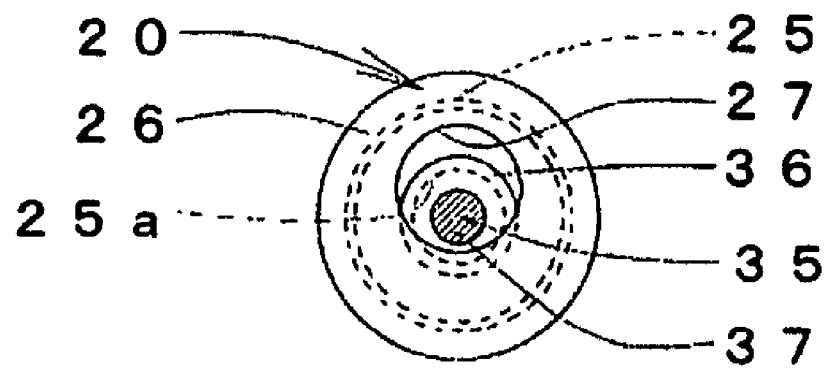
FIG. 11 is a cross-sectional view taken along the line A-A of FIG. 10 and looking in the direction of the appended arrows.
Figure 12:
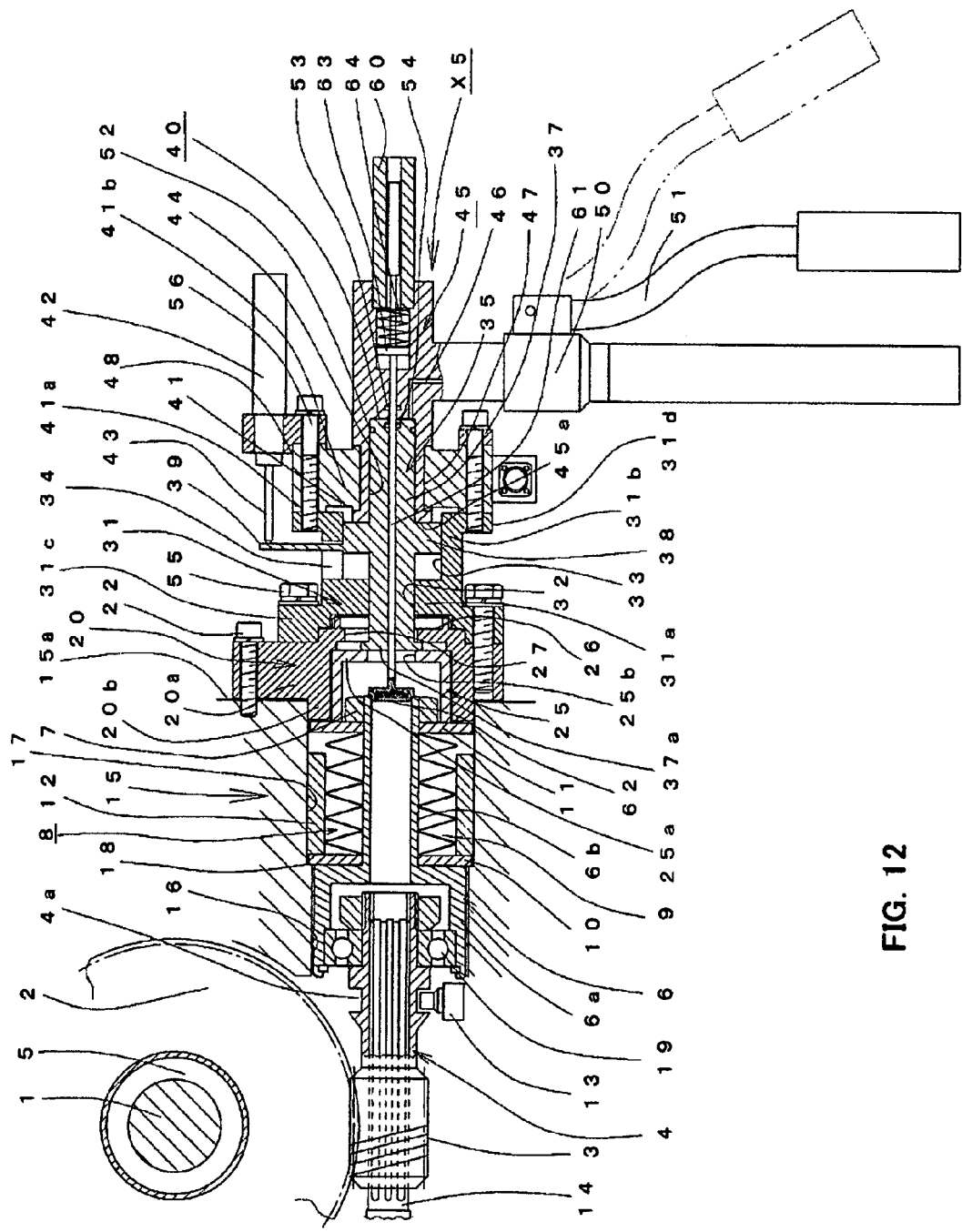
FIG. 12 is a cross-sectional view illustrating the valve element driving part, to which a spring compression mechanism having a differential displacement gauge is attached via an adapter having an oil leakage preventing function.
Figure 13:
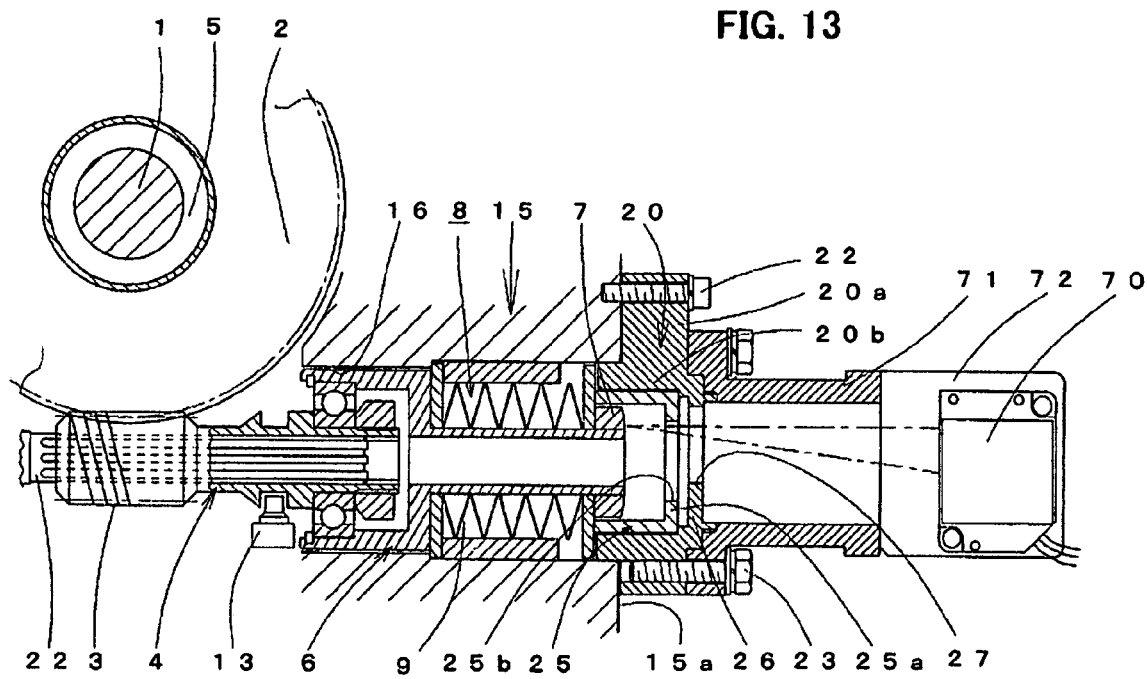
FIG. 13 is a cross-sectional view illustrating the valve element driving part, to which a laser sensor is attached via an adapter having an oil leakage preventing function.
Figure 14:
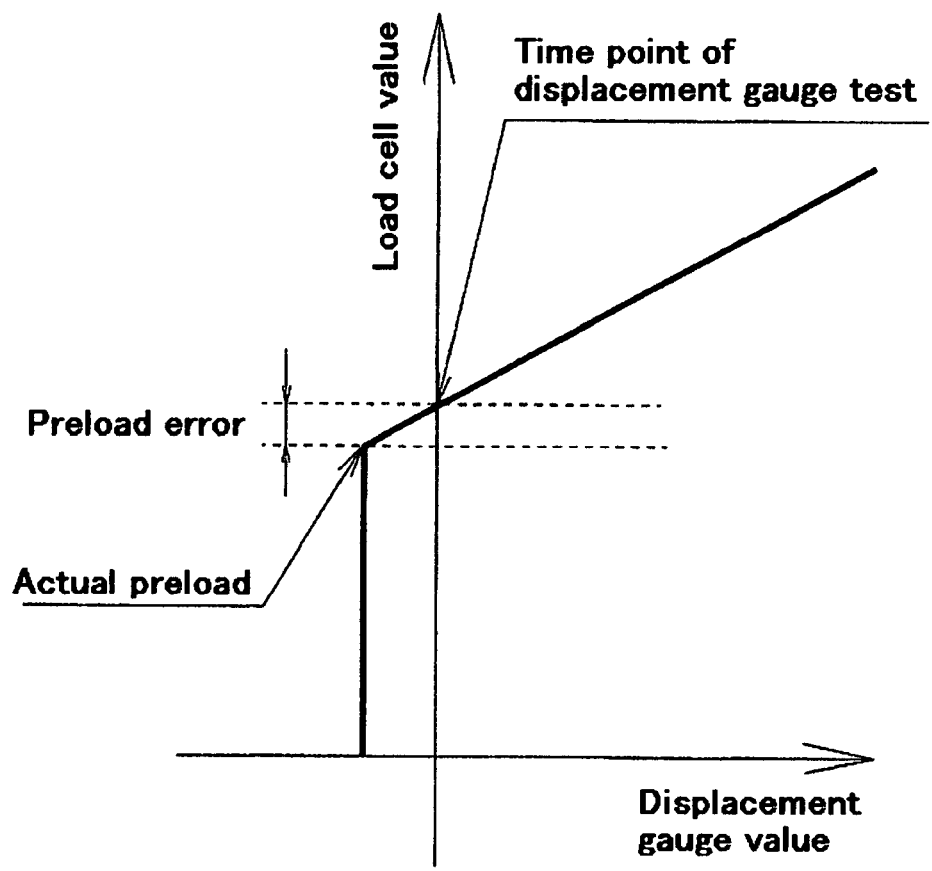
FIG. 14 is an explanatory view of a method for acquiring a spring characteristic using a conventional spring compression mechanism.
Figure 15:
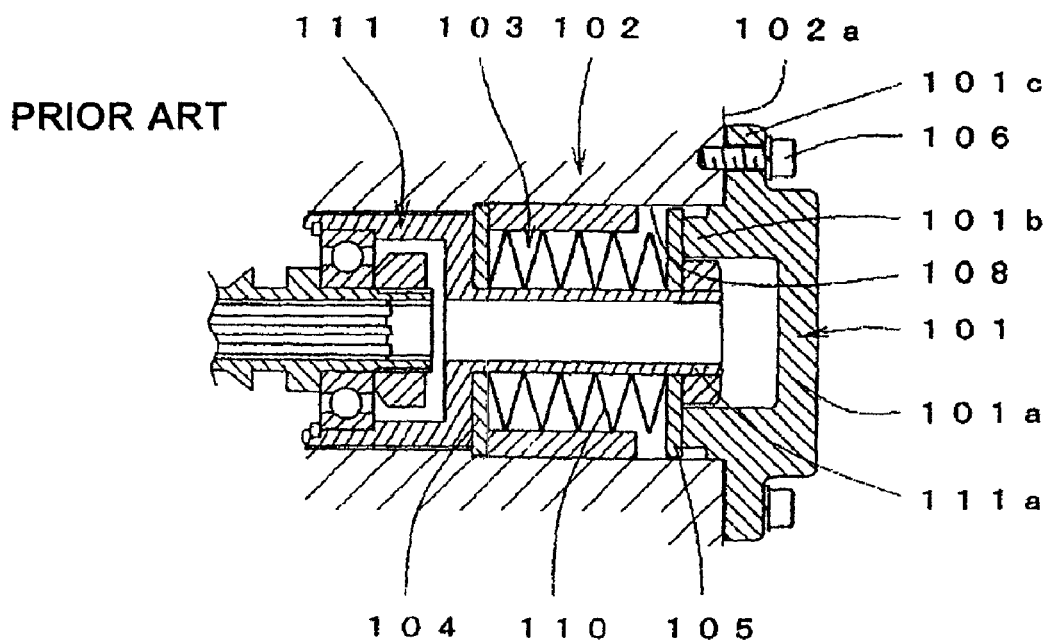
FIG. 15 is a structural view of a conventional spring cartridge.

1: valve shaft
2: worm wheel
3: worm
4: worm shaft
5: stem nut
6: movable shaft
7: nut
8: spring cartridge
9: disc spring(s)
10: washer
11: washer
12: stopper
13: torque switch
14: motor shaft
15: casing
16: small-diameter bore
17: large-diameter bore
18: shoulder
19: bearing
20: adapter
21: cap
22: bolt
23: bolt
25: intermediate body
26: weir
27: circular hole
31: base
32: small-diameter bore
33: large-diameter bore
34: opening
35: pusher
36: cylindrical portion
37: shaft portion
38: guide portion
39: extended portion
40: pressure chamber
41: load cell
42: linear gauge
43: operation element
44: sliding hole
45: cylinder structural component
46: oil passage
47: engaging portion
48: bracket
50: hydraulic pump
51: operating handle
52: packing
53: packing
54: packing
55: bolt
57: hydraulic pump
58: control unit
60: differential displacement gauge
61: interlocking rod
62: receiving portion
63: spring bearing
64: spring
66: support tool
67: small-diameter portion
68: large-diameter portion
69: flange portion
70: laser sensor
71: support cylinder
72: sensor mounting stage
80: differential displacement gauge
81: support cylinder
82: operation element
83: spring
X1: spring compression mechanism X2: spring compression mechanism
X3: spring compression mechanism
X4: spring compression mechanism

The invention claimed is:

1. A motor-operated valve diagnosing device for diagnosing a motor-operated valve which comprises a valve element driving part for opening and closing a valve element using a rotational driving force of a worm to which a rotational driving force is applied, and a spring cartridge which expands and contracts in proportion to a reaction force exerted thereon from the valve element side of said valve element driving part in an axial direction of said worm, said motor-operated valve diagnosing device comprising a spring compression mechanism operable for compressing the spring cartridge externally and measuring a compression force thereon simultaneously with measuring an amount of compression thereof, or a worm displacement measuring means for measuring displacement of said worm, wherein said spring compression mechanism or said worm displacement measuring means is attachable to the valve element driving part via an adapter, and wherein said spring compression mechanism has a unitary structure including a base attachable to the adapter; a pusher assembled to said base for reciprocating movement in an axial direction thereof; a compressing means for pressing said pusher in an axial direction thereof to compress said spring cartridge via said pusher; a compression force measuring means for measuring an axial force on said pusher as a compression force on said spring cartridge; and a compression amount measuring means for measuring an axial displacement of said pusher as an amount of compression of said spring cartridge.

2. A motor-operated valve diagnosing device according to claim 1, wherein said spring compression mechanism is attachable to a support tool for supporting said spring cartridge in a separated state via said adapter.

3. A motor-operated valve diagnosing device according to claim 1 or claim 2, wherein said compression force measuring means is capable of measuring both a compression force which is exerted on said spring cartridge when the motor-operated valve is operating, and a compression force which is exerted on said spring cartridge by compression of said compressing means when the motor-operated valve is in a stopped state.

4. A motor-operated valve diagnosing device according to claim 1 or claim 2, further comprising said worm displacement measuring means is operable for measuring an axial displacement of said worm when the motor-operated valve is operating.

5. A motor-operated valve diagnosing device according to claim 1 or claim 2, wherein said compressing means comprises a hydraulic pressure driving mechanism.

6. A motor-operated valve diagnosing device according to claim 1 or claim 2, wherein said hydraulic pressure driving mechanism is manually operable.

7. A motor-operated valve diagnosing device according to claim 5, wherein said hydraulic pressure driving mechanism is electrically operable.

8. A motor-operated valve diagnosing device according to claim 7, wherein said hydraulic pressure driving mechanism compresses said spring cartridge with a compression characteristic corresponding to operating characteristics of said worm at a time when the motor-operated valve is operating.

9. A motor-operated valve diagnosing device according to claim 3, wherein said compressing means comprises a hydraulic pressure driving mechanism.

10. A motor-operated valve diagnosing device according to claim 9, wherein said hydraulic pressure driving mechanism is manually operable.

11. A motor-operated valve diagnosing device according to claim 9, wherein said hydraulic pressure driving mechanism is electrically operable.

12. A motor-operated valve diagnosing device according to claim 11, wherein said hydraulic pressure driving mechanism compresses said spring cartridge with a compression characteristic corresponding to operating characteristics of said worm at a time when the motor-operated valve is operating.

13. A motor-operated valve diagnosing device according to claim 4, wherein said compressing means comprises a hydraulic pressure driving mechanism.

14. A motor-operated valve diagnosing device according to claim 3, wherein said hydraulic pressure driving mechanism is manually operable.

15. A motor-operated valve diagnosing device according to claim 3, wherein said hydraulic pressure driving mechanism is electrically operable.

16. A motor-operated valve diagnosing device according to claim 5, wherein said hydraulic pressure driving mechanism compresses said spring cartridge with a compression characteristic corresponding to operating characteristics of said worm at a time when the motor-operated valve is operating.

* * * * *